United States Patent
Yang et al.

(10) Patent No.: US 9,730,240 B2
(45) Date of Patent: Aug. 8, 2017

(54) COMMUNICATION METHOD CONSIDERING CARRIER TYPE AND APPARATUS FOR SAME

(71) Applicant: LG Electronics Inc., Seoul (KR)

(72) Inventors: Suckchel Yang, Seoul (KR); Joonkui Ahn, Seoul (KR); Yunjung Yi, Seoul (KR); Dongyoun Seo, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 14/786,215

(22) PCT Filed: May 12, 2014

(86) PCT No.: PCT/KR2014/004225
§ 371 (c)(1),
(2) Date: Oct. 22, 2015

(87) PCT Pub. No.: WO2014/185673
PCT Pub. Date: Nov. 20, 2014

(65) Prior Publication Data
US 2016/0081107 A1 Mar. 17, 2016

Related U.S. Application Data

(60) Provisional application No. 61/822,311, filed on May 11, 2013, provisional application No. 61/826,014, (Continued)

(51) Int. Cl.
*H04W 4/00* (2009.01)
*H04W 72/12* (2009.01)
(Continued)

(52) U.S. Cl.
CPC ......... *H04W 72/1205* (2013.01); *H04L 5/001* (2013.01); *H04L 5/005* (2013.01);
(Continued)

(58) Field of Classification Search
CPC ......... H04W 72/1205; H04W 72/1289; H04W 72/042; H04L 5/005; H04L 5/001;
(Continued)

(56) References Cited

U.S. PATENT DOCUMENTS 9,432,986 B2* 8/2016 Yang ...................... H04L 5/0028
9,432,994 B2* 8/2016 Yang ...................... H04L 5/001
(Continued)

FOREIGN PATENT DOCUMENTS

WO 2013035974 3/2013

OTHER PUBLICATIONS

U.S. Appl. No. 61/753,914, filed Jan. 17, 2013.*
(Continued)

*Primary Examiner* — Chuong T Ho
(74) *Attorney, Agent, or Firm* — Dentons US LLP

(57) ABSTRACT

The present invention relates to a method for a terminal, which operates in a half-duplex manner, to communicate with a base station in a wireless communication system supporting a plurality of carrier types, and an apparatus for the same. More particularly, the present invention relates to a method and an apparatus for the same, the method comprising the step of: transmitting a signal to, or receiving a signal from, a base station in a first cell set to be in a time division duplex (TDD) manner via a first subframe positioned between a downlink subframe and an uplink subframe, wherein if the first cell operates as a first carrier type, the first subframe includes a first downlink section, a first protection section, and a first uplink section, and if the first cell operates as a second carrier type, the first subframe includes only a second downlink section and a second protection section, or includes only a second uplink section and the second protection section. The first carrier type represents a carrier type in which a cell-common reference
(Continued)

(a) Frame structure type-1

(b) Frame structure type-2 signal is transmitted over the entire system band in all subframes, and the second carrier type represents a carrier type in which the cell-common reference signal is transmitted over at least a part of the system band in some subframes.

14 Claims, 17 Drawing Sheets

Related U.S. Application Data filed on May 21, 2013, provisional application No. 61/826,546, filed on May 23, 2013, provisional application No. 61/828,178, filed on May 28, 2013, provisional application No. 61/837,148, filed on Jun. 19, 2013, provisional application No. 61/839,381, filed on Jun. 26, 2013, provisional application No. 61/865,154, filed on Aug. 13, 2013.

(51) Int. Cl.
  *H04L 5/00* (2006.01)
  *H04L 5/14* (2006.01)
  *H04W 72/04* (2009.01)

(52) U.S. Cl.
  CPC .......... *H04L 5/0016* (2013.01); *H04L 5/0023* (2013.01); *H04L 5/0048* (2013.01); *H04L 5/0053* (2013.01); *H04L 5/1469* (2013.01); *H04W 72/042* (2013.01); *H04W 72/1289* (2013.01)

(58) Field of Classification Search
  CPC ... H04L 5/0016; H04L 5/0023; H04L 5/0048; H04L 5/1469; H04L 5/0053
  USPC ........................................ 370/329, 330, 328
  See application file for complete search history.

(56) References Cited

U.S. PATENT DOCUMENTS 9,591,660 B2 * 3/2017 Yang ....................... H04L 5/005

| | | |
|---|---|---|
| 2011/0205954 A1 | 8/2011 | Gorokhov et al. |
| 2011/0244873 A1 | 10/2011 | Lee et al. |
| 2011/0286440 A1 | 11/2011 | Chung et al. |
| 2012/0163335 A1 | 6/2012 | Chung et al. |
| 2012/0188988 A1 | 7/2012 | Chung et al. |
| 2013/0003672 A1 | 1/2013 | Dinan |
| 2013/0077523 A1 | 3/2013 | Ko et al. |
| 2014/0056188 A1 | 2/2014 | Yang et al. |
| 2014/0126517 A1 | 5/2014 | Choi et al. |
| 2014/0169318 A1 | 6/2014 | Takamatsu |
| 2014/0241222 A1 | 8/2014 | Yang et al. |
| 2014/0334399 A1 * | 11/2014 | Xu ................... H04W 56/0015 370/329 |
| 2015/0009870 A1 * | 1/2015 | Bashar .............. H04W 52/0251 370/280 |
| 2015/0016408 A1 * | 1/2015 | Yang ....................... H04L 5/001 370/330 |
| 2015/0124724 A1 * | 5/2015 | Yang ..................... H04L 5/0028 370/329 |
| 2016/0044706 A1 * | 2/2016 | Yang ....................... H04L 5/005 370/329 |

OTHER PUBLICATIONS

LG Electronics, "Support of TDD special subframe for the new carrier type," R1-131285, 3GPP TSG RAN WG1 Meeting #72bis, Chicago, USA, Apr. 15-19, 2013, see pp. 2 and 3.

Asustek, "CSI reference subframe for half duplex TDD UE," R1-131041, 3GPP TSG RAN WG1 Meeting #72bis, Chicago, USA, Apr. 15-19, 2013, see pp. 1 and 2.

Pantech, "Considerations on reference signal in TDD special subframe," R1-131523, 3GPP TSG RAN WG1 Meeting #72-bis, Chicago, USA, Apr. 15-19, 2013, see pp. 1-3.

Nokia Siemens Networks, Nokia Corporation: "DM RS for additional special subframe configuration", 3GPP TSG-RAN WG1 Meeting #69, R1-122430, May 21-25, 2012.

Intel Corporation: "Discussion on downlink transmission for special subframe in TDD", 3GPP TSG RAN WG1 Meeting 072, R1-130337, Jan. 28-Feb. 1, 2013.

* cited by examiner

FIG. 16
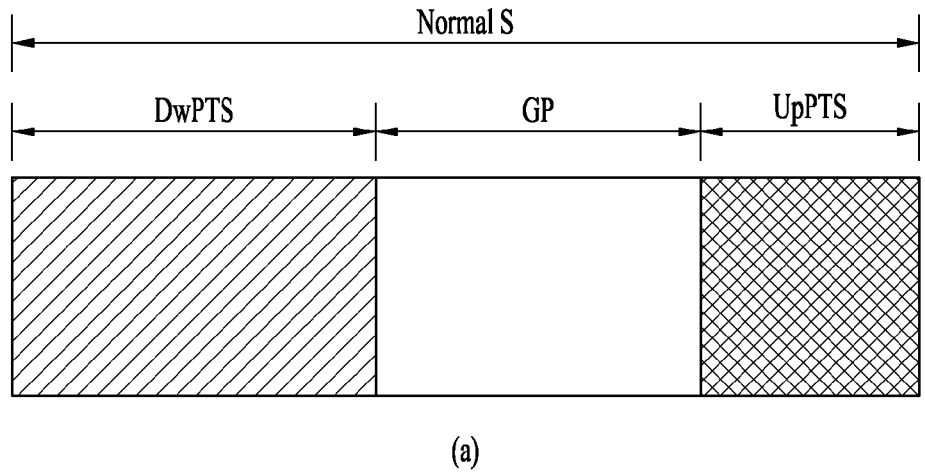
(a)
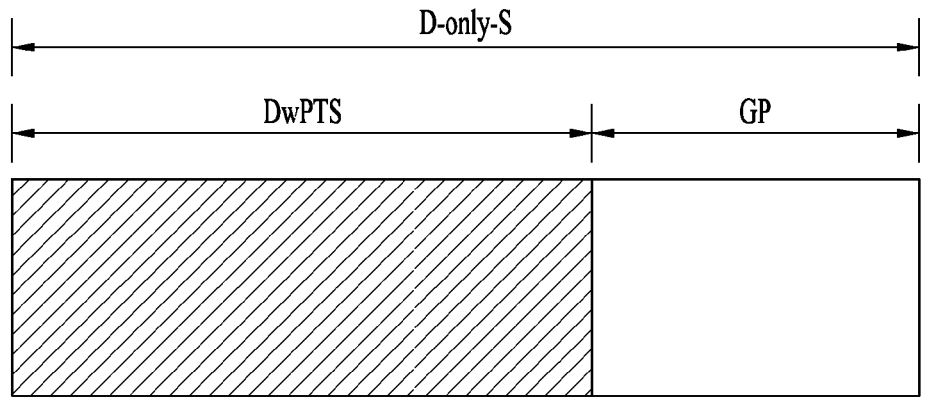
(b)
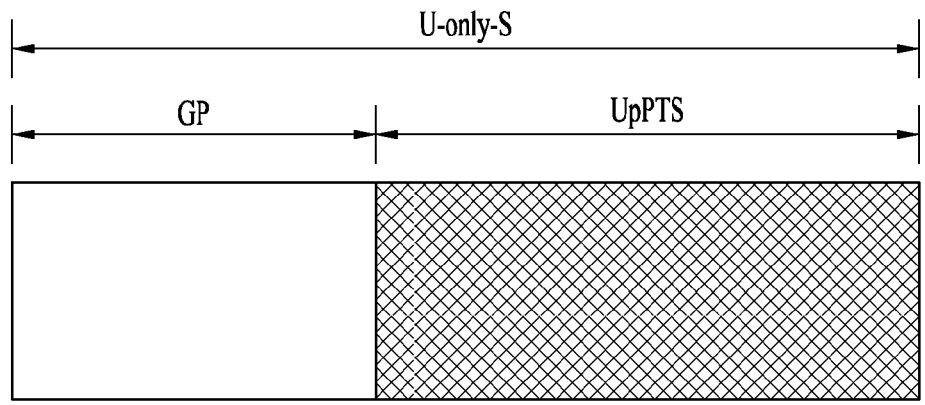
(c)

COMMUNICATION METHOD CONSIDERING CARRIER TYPE AND APPARATUS FOR SAME

This application is a 35 USC §371 National Stage entry of International Application No. PCT/KR2014/004225 filed on May 12, 2014, and claims priority to U.S. Provisional Application Nos. 61/822,311 filed on May 11, 2013; 61/826,014 filed on May 21, 2013; 61/826,546 filed on May 23, 2013; 61/828,178 filed on May 28, 2013; 61/837,148 filed on Jun. 19, 2013; 61/839,381 filed on Jun. 26, 2013 and 61/865,154 filed on Aug. 13, 2013, all of which are hereby incorporated by reference in their entireties as if fully set forth herein.

TECHNICAL FIELD

The present invention relates to a wireless communication system. More specifically, the present invention relates to a method and apparatus for configuring a subframe and/or a method and apparatus for transmitting and receiving a signal in consideration of carrier type.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA). In a wireless communication system, a user equipment (UE) can receive information from an eNB on downlink (DL) and transmit information to the eNB on uplink (UL). Information transmitted or received by the UE includes data and various types of control information and there are various physical channels according to types and purposes of information transmitted or received by the UE.

DISCLOSURE

Technical Problem

An object of the present invention is to provide an effective subframe structure in a wireless communication system for supporting a plurality of carrier types.

An object of the present invention is to provide an effective structure of a subframe corresponding to a switching period of downlink and uplink in a wireless communication system for supporting a plurality of carrier types.

An object of the present invention is to provide a method and apparatus for effectively handling collision when uplink and downlink collide in a specific time period between a plurality cells aggregated in a user equipment (UE) that does not support simultaneous transceiving operation/capability.

It is to be understood that both the foregoing general description and the following detailed description of the present invention are exemplary and explanatory and are intended to provide further explanation of the invention as claimed.

Technical Solution

In an aspect of the present invention, provided herein is a method for communicating with a base station by a user equipment (UE) operating in half-duplex in a wireless communication system for supporting a plurality of carrier types, the method comprising: transmitting or receiving a signal to or from the base station through a first subframe located between a downlink subframe and an uplink subframe in a first cell configured in time division duplex (TDD), wherein when the first cell operates as a first carrier type, the first subframe comprises a first downlink period, a first guard period, and a first uplink period, wherein when the first cell operates as a second carrier type, the first subframe comprises only a second downlink period and a second guard period or comprises only a second uplink period or the second guard period, and wherein the first carrier type indicates a carrier type in which a cell-common reference signal is transmitted over an entire system band in all subframes, and the second carrier type indicates a carrier type in which the cell-common reference signal is transmitted over at least part of the system band in some subframes.

In another aspect of the present invention, provided herein is a user equipment (UE) operating in a wireless communication system for supporting a plurality of carrier types, the UE comprising: a radio frequency (RF) unit; and a processor, wherein the processor is configured to: transmit or receive a signal to or from the base station through a first subframe located between a downlink subframe and an uplink subframe in a first cell configured in time division duplex (TDD) through the RF unit, wherein when the first cell operates as a first carrier type, the first subframe comprises a first downlink period, a first guard period, and a first uplink period, wherein when the first cell operates as a second carrier type, the first subframe comprises only a second downlink period and a second guard period or comprises only a second uplink period or the second guard period, and wherein the first carrier type indicates a carrier type in which a cell-common reference signal is transmitted over an entire system band in all subframes, and the second carrier type indicates a carrier type in which the cell-common reference signal is transmitted over at least part of the system band in some subframes.

Preferably, when a second cell is additionally aggregated with the first cell in the UE, and when a link direction of the first cell and a link direction of the second cell are different in an at least partial period of a time period corresponding to the first subframe, transmission or reception of a signal through the second cell is omitted in the at least partial period.

Preferably, when a second cell is additionally aggregated with the first cell in the UE, when the first cell operates as the first carrier type in the first subframe, and when the second cell is configured as downlink in an at least partial period of a time period corresponding to the first subframe, a downlink signal is received through the second cell only in a specific period of the time period.

Preferably, the specific period corresponds to the first downlink period, a downlink period configured in the second cell, a downlink period having a shorter length from among the first cell and the second cell, or a downlink period having a smaller number of symbols from among the first cell and the second cell.

Preferably, when a second cell is additionally aggregated with the first cell in the UE, when the first cell operates as the first carrier type in the first subframe, and when the second cell is configured as uplink in a time period corresponding to the first subframe, transmission of a physical uplink shared channel signal or a physical uplink control channel signal through the second cell is omitted in the time period.

Preferably, when a second cell is additionally aggregated with the first cell in the UE, when the first cell operates as the second carrier type and the second cell operates as the first carrier type in a time period corresponding to the first subframe, when the first subframe comprises only the second downlink period and the second guard period, and when the second cell is configured as downlink in the time period, detection or reception a physical downlink shared channel, a physical downlink control channel mapped over a data region of a subframe, a physical multicast channel, and a positioning reference signal is omitted in the time period.

Preferably, when a second cell is additionally aggregated with the first cell in the UE, when the first cell operates as the second carrier type and the second cell operates as the first carrier type in a time period corresponding to the first subframe, when the first subframe comprises only the second downlink period and the second guard period, and when the second cell is configured as uplink in the time period, transmission of a physical uplink shared channel and a physical uplink control channel is omitted in the time period.

Preferably, a length of the second uplink period is increased by a length of the first downlink period as compared to a length of the first uplink period, and a length of the second downlink period is increased by a length of the first uplink period as compared to a length of the first downlink period.

Advantageous Effects

A subframe structure according to the present invention may enhance efficiency in a wireless communication system for supporting a plurality of carrier types.

A subframe structure according to the present invention may effectively transmit and receive a signal in a switching period of downlink and uplink in a wireless communication system for supporting a plurality of carrier types.

In addition, the present invention may effectively handle collision when uplink and downlink collide in a specific time period between a plurality cells aggregated in a user equipment (UE) that does not support simultaneous transceiving operation/capability.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 16 illustrates an example of a special subframe configuration.

BEST MODE

Figure 1:
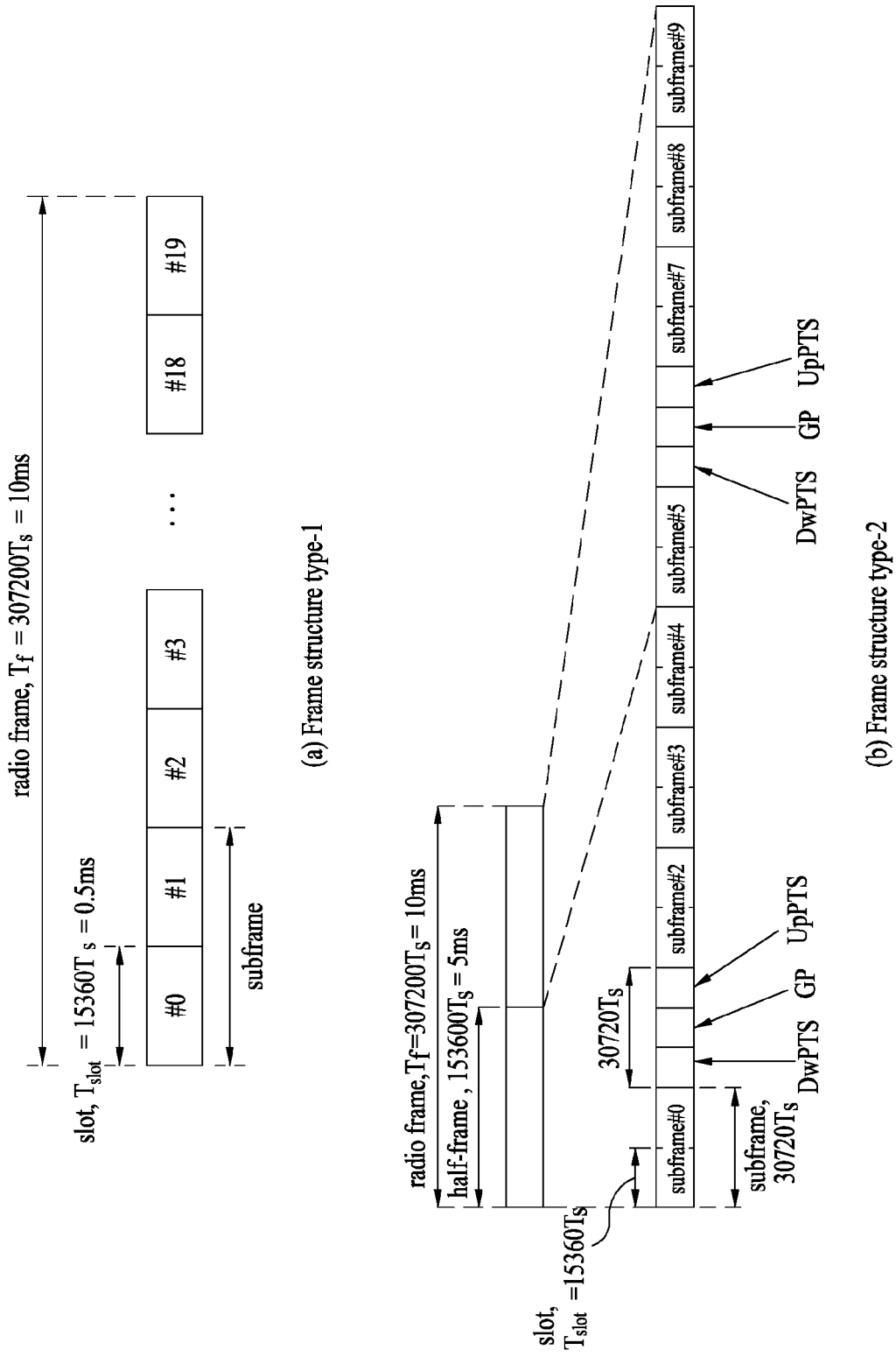
FIG. 1 illustrates a structure of a radio frame.

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE.

For clarity of explanations, the following description focuses on 3GPP LTE(-A) system. However, technical features of the present invention are not limited thereto. Further, a particular terminology is provided for better understanding of the present invention. However, such a particular terminology may be changed without departing from the technical spirit of the present invention. For example, the present invention may be applied to a system in accordance with a 3GPP LTE/LTE-A system as well as a system in accordance with another 3GPP standard, IEEE 802.xx standard, or 3GPP2 standard.

In the present specification, a user equipment (UE) may be a fixed station or a mobile station, and the UE may be one of various equipments transmitting and receiving data and/or control information by communicating with a base station (BS). The UE may be referred to as a terminal, a mobile station (MS), a mobile terminal (MT), a user terminal (UT), a subscriber station (SS), a wireless device, a personal digital assistant (PDA), a wireless modem, a handheld device, and etc. In the present specification, the term "UE" may be interchangeably used with the term "terminal".

In the present specification, a base station (BS) may be a fixed station communicating with a UE and/or another BS in general, but may refer to a mobile station in some systems. The BS exchanges data and control information by communicating with a UE and another BS. A base station (BS) may be referred to as an advanced base station (ABS), a node-B (NB), an evolved nodeB (eNB), a base transceiver system (BTS), an access point, a processing server (PS), a node, a transmission point (TP), and etc. In the present specification, a base station (BS) may be interchangeably used with eNB. Further, in a system supporting a small cell or a device-to-device communication, a base station may represent the small cell or a cluster header UE, respectively.

FIG. 1 illustrates a structure of a radio frame used in the LTE(-A) system. Uplink/downlink data packet transmission is performed in the unit of a subframe (SF), and one subframe is defined as a time interval including a plurality of symbols. The 3PP LTE system supports a type-1 radio frame structure applicable to frequency division duplex (FDD) and a type-2 radio frame structure applicable to time division duplex (TDD).

FIG. 1(a) illustrates the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDM is used in downlink, an OFDM symbol indicates one symbol period. An OFDM symbol may be referred to as an SC-FDMA symbol in the present specification, and also may be referred to as a symbol period. A resource block (RB) as a resource assignment unit may include a plurality of consecutive subcarriers in one slot.

The number of OFDM symbols included in one slot may vary according to a configuration of cyclic prefix (CP). The cyclic prefix includes an extended CP and a normal CP. For example, if OFDM symbols are configured by the normal CP, the number of OFDM symbols included in one slot may be 7. In case that an OFDM symbol is configured with an extended CP, a length of one OFDM symbol is larger, so that the number of OFDM symbols included in one slot is fewer than that of normal CP. In case of the extended CP, for example, the number of OFDM symbols included in one slot may be 6. When a channel status is not stable such as a UE moving in a high speed, an extended CP may be used to reduce an inter-symbol interference.

In the case that a normal CP is used, since a slot includes 7 OFDM symbols, a subframe includes 14 OFDM symbols. A maximum of initial 3 OFDM symbols may be allocated to a physical downlink control channel (PDCCH), and remaining OFDM symbols may be allocated to a physical downlink shared channel (PDSCH).

FIG. 1(b) illustrates a structure of the type-2 radio frame. The type-2 radio frame includes two half frames, and each half frame includes four (or five) normal subframes and one (or zero) special subframe. A normal subframe is used for uplink or downlink according to an uplink-downlink (UL-DL) configuration. One subframe includes two slots.

Table 1 shows an example of an uplink-downlink (UL-DL) configuration of subframes within a radio frame in a TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D represents a downlink subframe (DL SF), U represents an uplink subframe (UL SF), and S represents a special subframe. The special subframe includes a downlink period, a guard period (GP), and an uplink period. Table 2 shows an example of a special subframe configuration. The downlink period may be referred to as a downlink pilot time slot (DwPTS), and the DwPTS is used for an initial cell search, synchronization, or channel estimation at a UE. The uplink period may be referred to as an uplink pilot time slot (UpPTS), and the UpPTS is used for a channel estimation and adjusting uplink transmission synchronization of a UE at a base station. The guard period is used to eliminate interference generated in uplink due to multi-path delay of a downlink signal between uplink and downlink.

In the case of a TDD-based LTE(-A) system, as illustrated in FIG. 1(b), a timing gap is required for the transition from a DL subframe to an UL subframe, and to this end a special subframe is included between a DL SF and a UL SF. The special SF may have various configuration according to radio condition, a location of a UE and etc. DwPTS/GP/UpPTS may be variously configured according to special subframe (SF) configuration. Table 2 illustrates a special subframe configuration.

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The above-described radio frame structure is exemplary. Thus, the number of subframes in a radio frame, the number of slots in a subframe, or the number of symbols in a slot may be modified in various ways.

Figure 2:
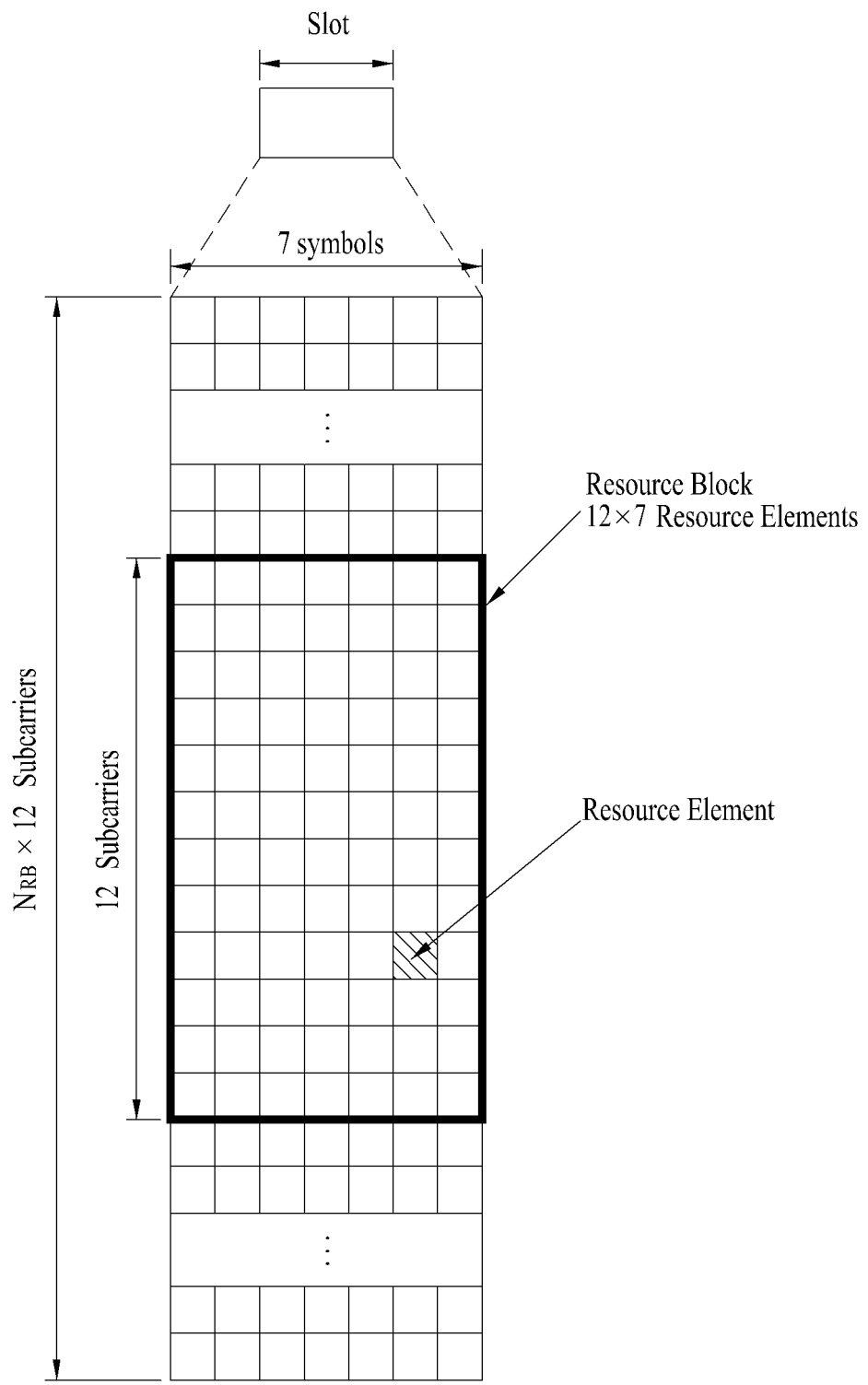
FIG. 2 illustrates a resource grid of one downlink slot.

FIG. 2 illustrates a resource grid of one downlink slot.

Referring to FIG. 2, a downlink slot includes a plurality of OFDM symbols in the time domain. One downlink slot may include 7 (or 6) OFDM symbols and include a plurality of resource blocks (RBs). One resource block (RB) may include 12 subcarriers in the frequency domain. Each element of the resource grid is referred to as a Resource Element (RE). An RB includes 12×7 (or 6) REs. The number of RBs in a downlink slot, $N_{DL}$, depends on a downlink transmission bandwidth. The structure of an uplink slot may have the same structure as a downlink slot, but an OFDM symbol is replaced by an SC-FDMA symbol.

Figure 3:
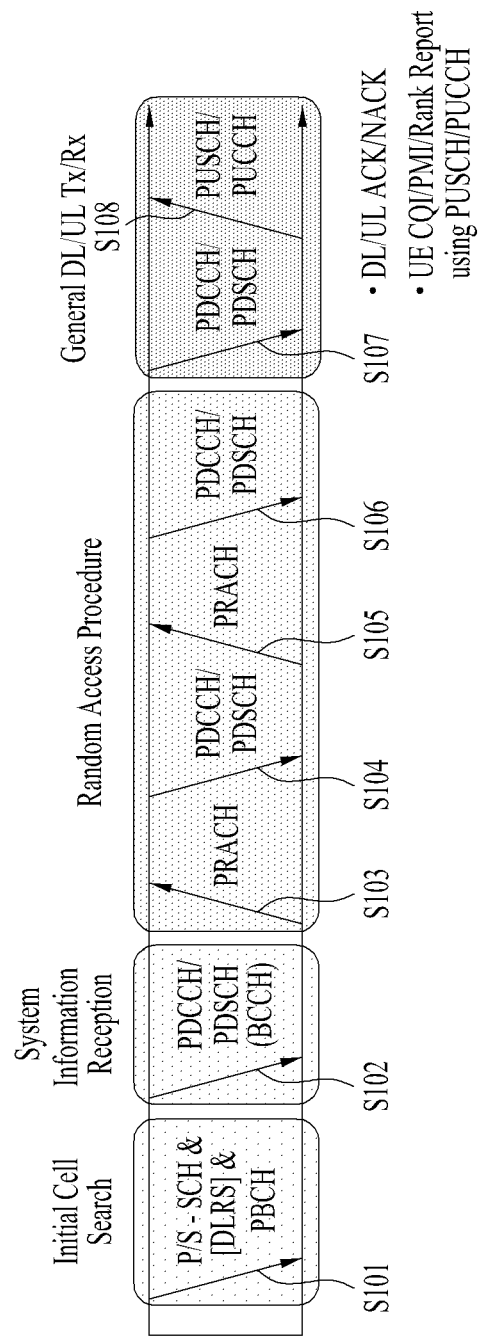
FIG. 3 illustrates physical channels used in LTE(-A) and a signal transmission method using the same.

FIG. 3 illustrates physical channels used in LTE(-A) and a signal transmission method using the same.

Referring to FIG. 3, when powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement (ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 4:
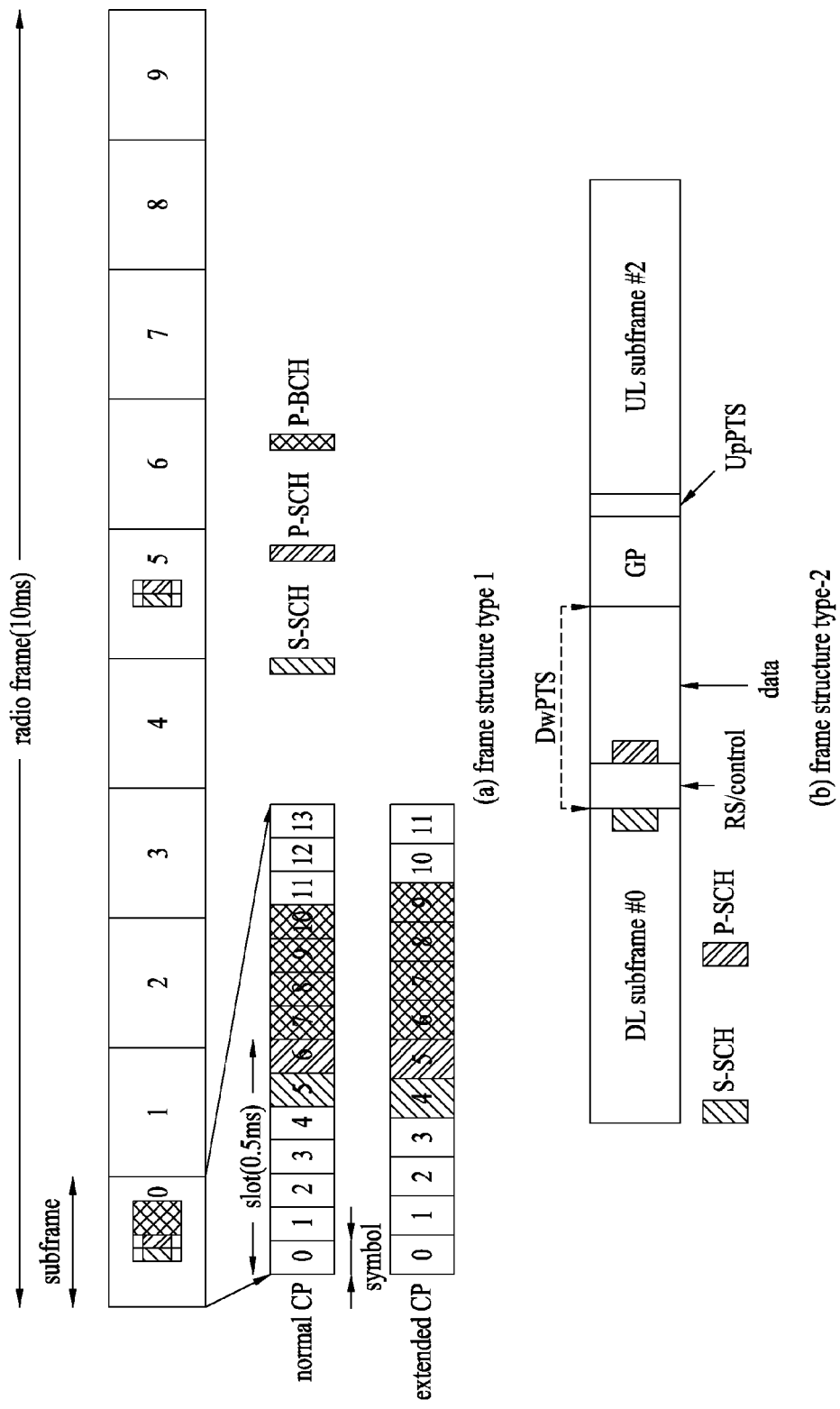
FIG. 4 illustrates a primary broadcast channel (P-BCH) and a synchronization channel (SCH).

FIG. 4 illustrates a primary broadcast channel (P-BCH) and a synchronization channel (SCH). The SCH includes a P-SCH and an S-SCH. The P-SCH carries a primary synchronization signal (PSS) and the S-SCH carries a secondary synchronization signal (SSS).

Referring to FIG. 4, in frame configuration type-1 (FDD), the P-SCH is located in the last OFDM symbols of slot #0 (i.e. the first slot of subframe #0) and slot #10 (i.e. the first slot of subframe #5) in each radio frame. The S-SCH is located OFDM symbols immediately before the last OFDM symbols of slot #0 and Slot #10. The S-SCH and P-SCH are disposed in consecutive OFDM symbols. In frame configuration type-2 (TDD), the P-SCH is transmitted through the third OFDM symbol of subframe #1/#6 and the S-SCH is located in the last OFDM symbols of slot #1 (i.e. the second slot of subframe #0) and slot #11 (i.e. the second slot of subframe #5). The P-SCH is transmitted for every 4 radio frames irrespective of frame configuration type using the first to fourth OFDM symbols of the second slot of subframe #0. The P-SCH is transmitted using 72 subcarriers (10 subcarriers are reserved and 62 subcarriers are used for PSS transmission) on the basis of direct current (DC) subcarriers in OFDM symbols. The S-SCH is transmitted using 72 subcarriers (10 subcarriers are reserved and 62 subcarriers are used for SSS transmission) on the basis of DC subcarriers in OFDM symbols. The P-BCH is mapped to 72 subcarriers on the basis of 4 OFDM symbols and DC subcarriers in one subframe.

Figure 5:
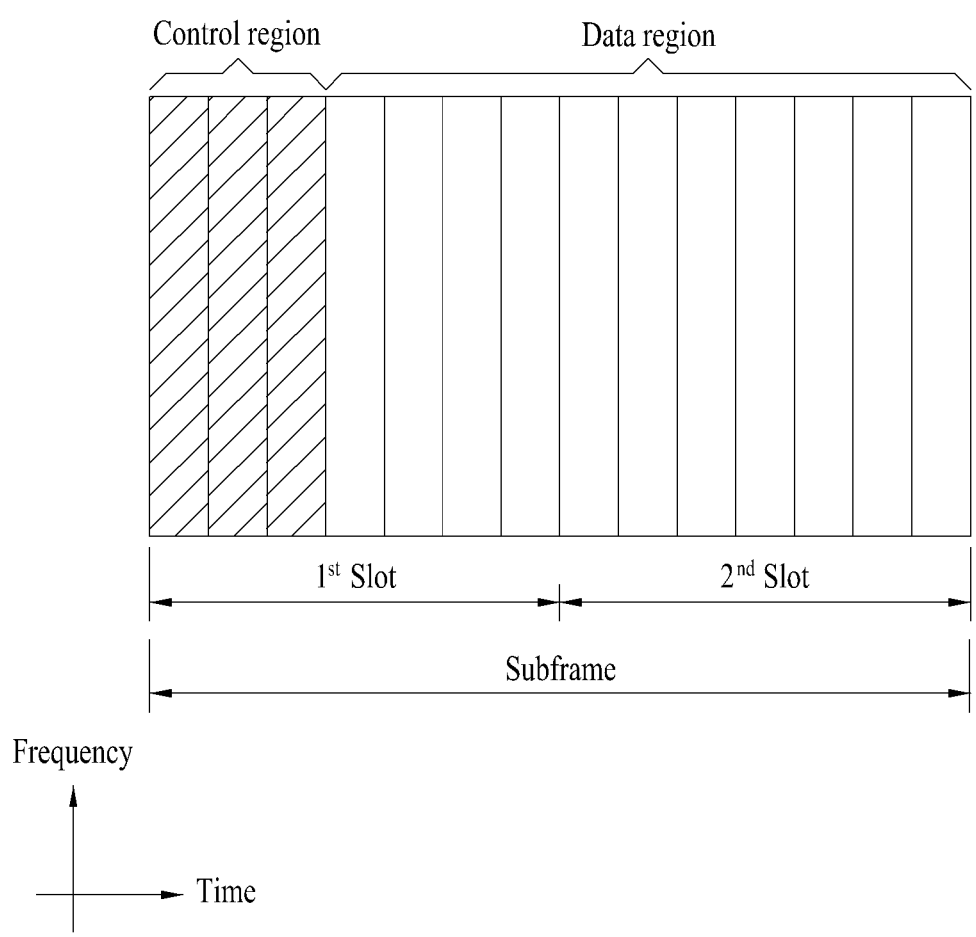
FIG. 5 illustrates a downlink subframe structure.

FIG. 5 illustrates a downlink subframe structure.

Referring to FIG. 5, a maximum of 3 (4) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc.

Figure 6:
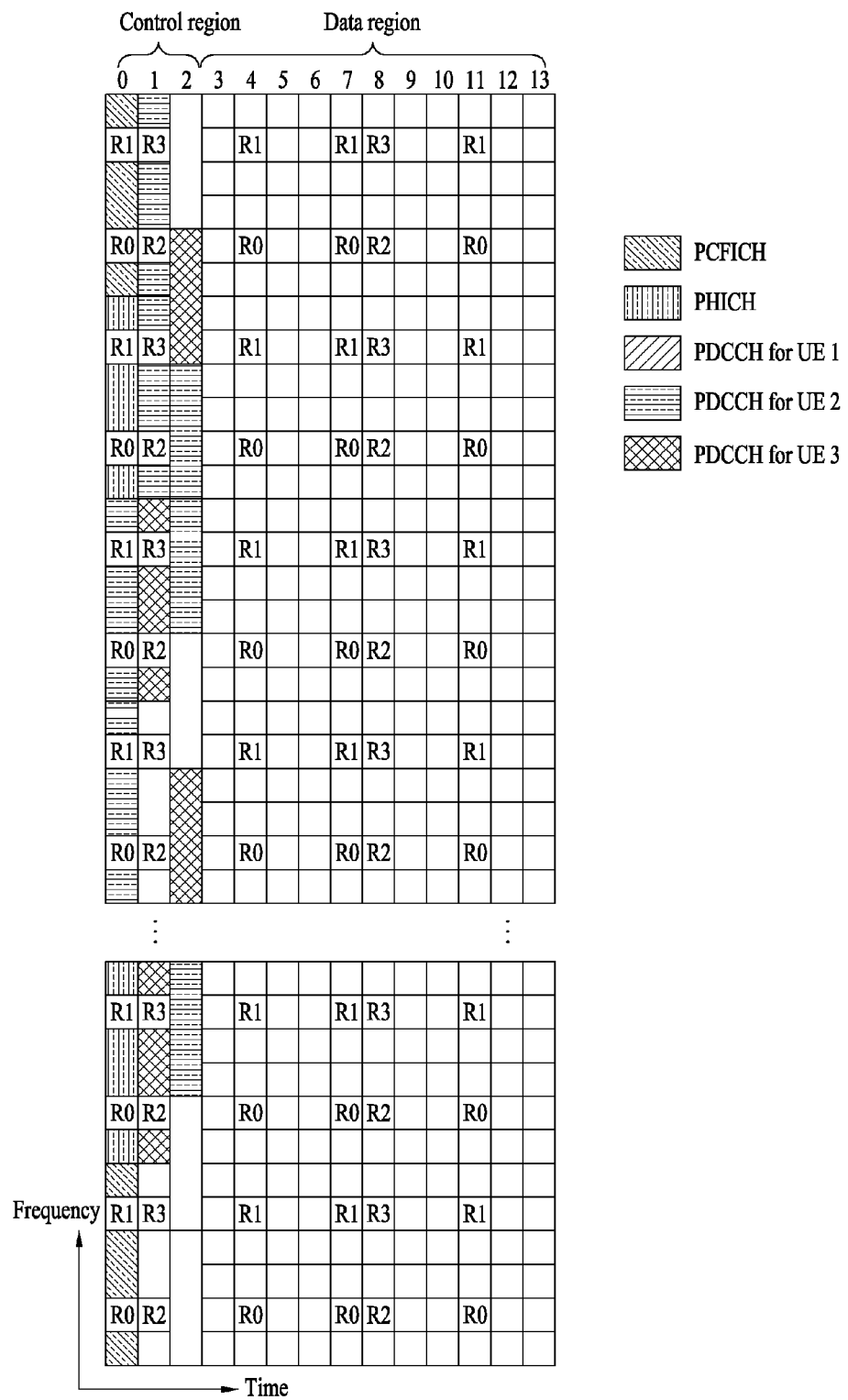
FIG. 6 illustrates a control channel allocated to a downlink subframe.

FIG. 6 illustrates a control channel allocated to a downlink subframe. In FIG. 6, R1 to R4 represent CRSs (Cell-specific Reference Signals or Cell-common Reference Signals) for antenna ports 0 to 3. A CRS is transmitted per subframe in total-band and fixed to a specific pattern in a subframe. The CRS is used for channel measurement and downlink signal demodulation.

Referring to FIG. 6, a PCFICH is transmitted at the first OFDM symbol of a subframe and carries information regarding the number of OFDM symbols used for transmission of control channels within the subframe. The PCFICH is composed of 4 REGs which are equally distributed in the control region on the basis of cell ID. The PCFICH indicates values of 1 to 3 (or 2 to 4) and is modulated according to QPSK (Quadrature Phase Shift Keying). The PHICH is a response of uplink transmission and carries an HARQ acknowledgment (ACK)/negative-acknowledgment (NACK) signal. The PHICH is allocated to REGs except CRS and PCFICH (the first OFDM symbol) in one or more OFDM symbols set based on PHICH duration. The PHICH is allocated to 3 REGs distributed in the frequency domain.

A PDCCH is allocated to the first n OFDM symbols (referred to as a control region hereinafter) of a subframe. Here, n is an integer equal to or greater than 1 and is indicated by a PCFICH. Control information transmitted through a PDCCH is referred to as DCI. Formats 0, 3, 3A and 4 for uplink and formats 1, 1A, 1B, 1C, 1D, 2, 2A, 2B and 2C for downlink are defined as DCI formats. Information field types, the number of information fields and the number of bits of each information field depend on DCI format. For example, the DCI formats selectively include information such as hopping flag, RB allocation, MCS (modulation coding scheme), RV (redundancy version), NDI (new data indicator), TPC (transmit power control), HARQ process number, PMI (precoding matrix indicator) confirmation as necessary.

The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

A plurality of PDCCHs can be transmitted in a subframe. Each PDCCH is transmitted using one or more CCEs each of which corresponds to 9 sets of 4 REs. 4 REs are referred to as a resource element group (REG). 4 QPSK symbols are mapped to an REG. An RE allocated to a reference signal is not included in an REG and thus the number of REGs in an OFDM symbol depends on presence or absence of a cell-specific reference signal.

Table 3 shows the number of CCEs, the number of REGs and the number of PDCCH bits according to PDCCH format.

TABLE 3

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify decoding, transmission of a PDCCH having a format composed of n CCEs can be started using a multiple of n CCEs. The number of CCEs used to transmit a specific PDCCH is determined by a BS according to channel quality. For example, in case of a PDCCH assigned to a UE having a high-quality downlink channel (e.g. a channel close to the BS), only one CCE can be used to transmit the PDCCH. However, in the case of a PDCCH assigned to a UE having a poor channel state (e.g. close to a cell edge), 8 CCEs can be used for PDCCH transmission in order to obtain sufficient robustness. In addition, a power level of the PDCCH can be controlled according to channel quality.

In LTE(-A), positions of CCEs in a limited set in which a PDCCH can be disposed for each UE are defined. The positions of CCEs in a limited set in which a UE can detect a PDCCH allocated thereto are referred to as the "search space (SS)". In LTE(-A), the size of the search space depends upon the PDCCH format. In addition, UE-specific and common search spaces are separately defined. The UE-specific search space (USS) is set on a UE basis, whereas the common search space (CSS) is known to all UEs. The USS and CSS may overlap. If a UE has a considerably small search space, no CCE is left when CCEs are allocated in the search space. Accordingly, a BS may not detect CCEs through which a PDCCH will be transmitted to the UE in a predetermined subframe, which is referred to as blocking. To minimize possibility that blocking continues in the next subframe, the start point of the USS is hopped in a UE-specific manner.

Sizes of the CSS and USS are shown in Table 4.

TABLE 4

| PDCCH format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes, a UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as formats 0 and 1A and may be discriminated from each other by scrambling CRC with different (common) identifiers rather than a UE-specific identifier. PDSCH transmission schemes according to transmission mode and information content of DCI formats are arranged in the following.

Transmission Mode (TM)
Transmission mode 1: Transmission from a single BS antenna port
Transmission mode 1: Transmission from a single BS antenna port
Transmission mode 3: Open-loop spatial multiplexing
Transmission mode 4: Closed-loop spatial multiplexing
Transmission mode 5: Multi-user MIMO
Transmission mode 6: Closed-loop rank-1 precoding
Transmission mode 7: Single-antenna port (port 5) transmission
Transmission mode 8: Double layer transmission (ports 7 and 8) or single-antenna port (port 7 or 8) transmission
Transmission modes 9 and 10: Up to 8 layer transmission (ports 7 to 14) or single-antenna port (port 7 or 8) transmission.

DCI Format
Format 0: Resource grants for the PUSCH transmissions (uplink)
Format 1: Resource assignments for single codeword PDSCH transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mode 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments
Format 4: Resource grants for PUSCH transmission (uplink) in a cell set to multi-antenna port transmission mode DCI formats can be classified into a TM-dedicated format and a TM-common format. The TM-dedicated format refers to a DCI format set to a corresponding TM only and the TM-common format refers to a DCI format set to all TMs. For example, DCI format 2B is a TM-dedicated DCI format in the case of TM 8, DCI format 2C is a TM-dedicated DCI format in the case of TM 9 and DCI format 2D is a TM-dedicated DCI format in the case of TM 10. DCI format 1A may be a TM-common DCI.

In the mean time, in a long term evolution-advanced (LTE-A) system, a multimedia broadcast multicast service single frequency network (MBSFN)-based multimedia broadcast and multimedia service (MBMS) is defined in order to provide a broadcast service over a communication network. An MBSFN is technology for simultaneously transmitting the same data at the same time in all of nodes belonging to an MBSFN area in synchronization with a radio resource. Here, the MBSFN area refers to an area covered by one MBSFN. According to the MBSFN, even when the UE is located at an edge of coverage of a node that the UE has accessed, a signal of a neighboring node functions not as interference but as gain. That is, the MBSFN introduces a single frequency network (SFN) function for MBMS transmission, thereby reducing service interference caused by frequency switching in the middle of MBMS transmission. Therefore, the UE within the MBSFN area recognizes MBMS data transmitted by multiple nodes as data transmitted by one node and in this MBSFN area, the UE may receive a seamless broadcast service without an additional handover procedure even while in motion. In the MBSFN, since a plurality of nodes use a single frequency in order to simultaneously perform synchronized transmission, frequency resources can be saved and spectrum efficiency can be raised. The UE can receives a higher-layer signal notifying an MBSFN subframe, thereby knowing which subframe is reserved for MBSFN. A subframe reserved for MBSFN in downlink may be referred to as an MBSFN subframe.

Meanwhile, when a packet is transmitted in a wireless communication system, signal distortion may occur during transmission since the signal is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is referred to as a pilot signal or a reference signal.

Reference signals may be classified into a reference signal for acquiring channel information and a reference signal used for data demodulation. The former is for a UE to acquire channel information in downlink, the reference signal for acquiring channel information is transmitted in wideband, and a UE which does not receive downlink data in a specific subframe receives the reference signal. Further, this reference signal is used in a handover situation. The latter is a reference signal transmitted together when a base station transmits a downlink signal, and enables a UE to demodulate the downlink signal using the reference signal. The reference signal used for data demodulation is required to be transmitted in a data transmission region.

Downlink reference signal includes: i) a cell-specific reference signal (CRS) shared by all UEs in a cell; ii) a UE-specific reference signal for a specific UE only; iii) a demodulation reference signal (DM-RS) transmitted for coherent demodulation when a PDSCH is transmitted; iv) a channel state information reference signal (CSI-RS) for delivering channel state information (CSI) when a downlink DMRS is transmitted; v) a multimedia broadcast single frequency network (MBSFN) reference signal transmitted for coherent demodulation of a signal transmitted in MBSFN mode; and vi) a positioning reference signal used to estimate geographic position information of a UE.

Figure 7:
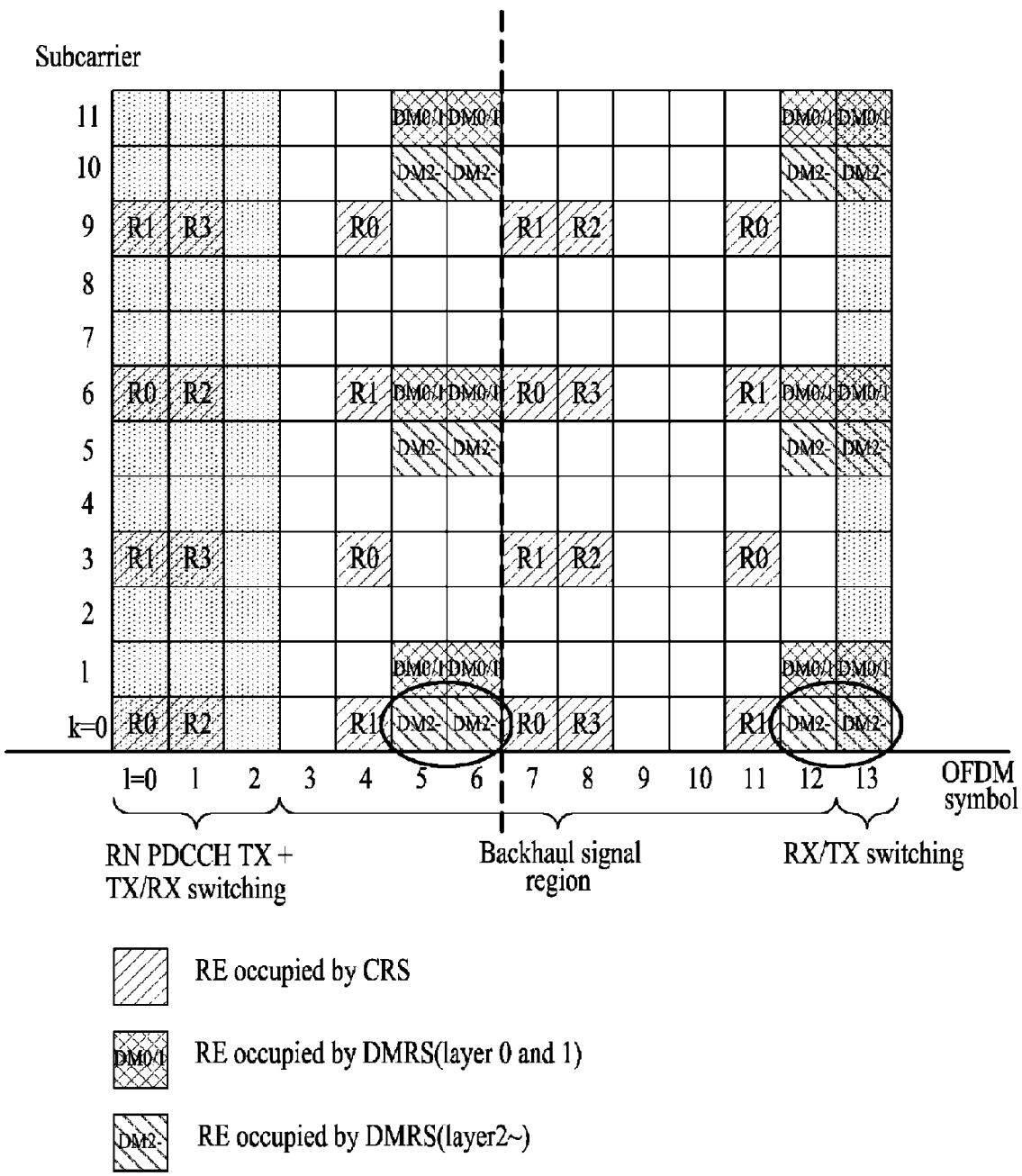
FIG. 7 illustrates a configuration of a demodulation reference signal (DM-RS) configuration added to LTE-A.

FIG. 7 illustrates a configuration of a demodulation reference signal (DM-RS) configuration added to LTE-A. A DM-RS is a UE-specific RS used to demodulate a signal of each layer when signals are transmitted using multiple antennas. Since LTE-A considers a maximum of 8 transmit antennas, a maximum of 8 layers and respective DM-RSs therefor are needed.

Referring to FIG. 7, two or more layers share the same RE and DM-RS is multiplexed according to CDM (Code Division Multiplexing). Specifically, DM-RSs for respective layers are spread using a spreading code (e.g. an orthogonal code such as a Walsh code or a DFT code) and then multiplexed to the same RE. For example, DM-RSs for layers 0 and 1 share the same RE and are spread on 2 REs of OFDM symbols 12 and 13 using an orthogonal code. That is, in each slot, the DM-RSs for layers 0 and 1 are spread using a code with SF (Spreading Factor)=2 in the time domain and then multiplexed to the same RE. For example, the DM-RS for layer 0 can be spread using [+1 +1] and the DM-RS for layer 1 can be spread using [+1 −1]. Similarly, DM-RSs for layers 2 and 3 are spread on the same REs using different orthogonal codes. DM-RSs for layers 4, 5, 6 and 7 are spread on REs occupied by DM-RSs 0, 1, 2 and 3 using a code orthogonal to layers 0, 1, 2 and 3. A code with SF=2 is used for DM-RS for up to 4 layers and a code with SF=4 is used for DM-RSs when five or more layers are used. Antenna ports for DM-RSs are $\{7, 8, \ldots, n+6\}$ (n being the number of layers).

Table 5 shows spreading sequences for antenna ports 7 to 14 defined in LTE-A.

TABLE 5

| Antenna port p | $[\bar{w}_p(0) \; \bar{w}_p(1) \; \bar{w}_p(2) \; \bar{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Referring to Table 5, orthogonal codes for antenna ports 7 to 10 have a structure in which a length-2 orthogonal code is repeated. Accordingly, a length-2 orthogonal code is used at the slot level for up to 4 layers and a length-4 orthogonal code is used at the subframe level when five or more layers are used.

Figure 8:
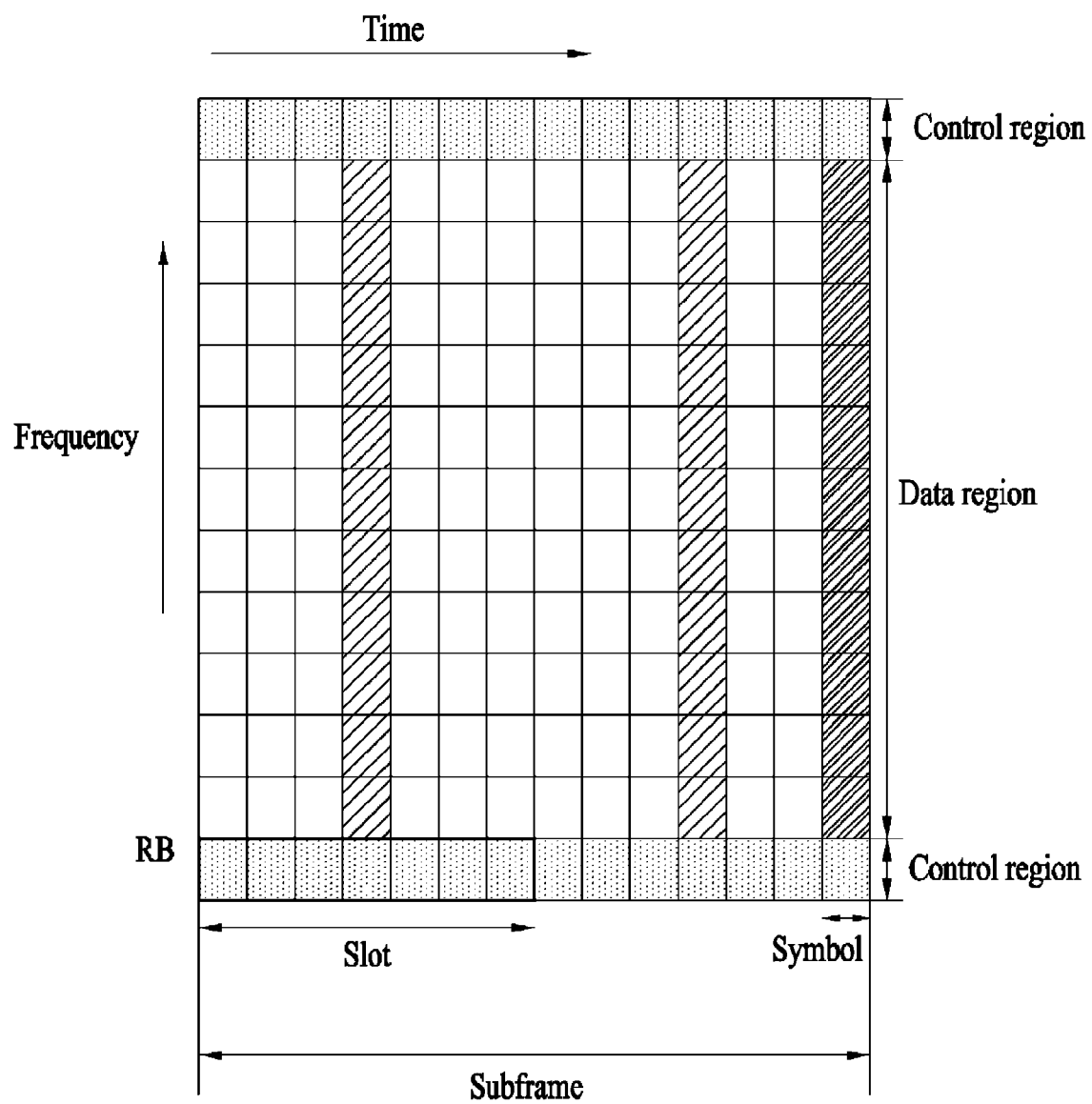
FIG. 8 illustrates a structure of an uplink subframe.

FIG. 8 illustrates a structure of an uplink subframe.

Referring to FIG. 8, the uplink subframe includes a plurality of slots (for example, two). Each slot may include a plurality of SC-FDMA symbols, wherein the number of SC-FDMA symbols included in each slot is varied depending on a cyclic prefix (CP) length. In an example, a slot may comprise 7 SC-FDMA symbols in case of normal CP, and a slot may comprise 6 SC-FDMA symbols in case of extended CP. An uplink subframe is divided into a data region and a control region. The data region includes a PUSCH, and is used to transmit a data signal that includes voice information. The control region includes a PUCCH, and is used to transmit uplink control information (UCI). The PUCCH includes RB pair (e.g. m=0, 1, 2, 3) located at both ends of the data region on a frequency axis (e.g. RB pair located frequency mirrored positions), and performs hopping on the border of the slots. The uplink control information (UCI) includes HARQ ACK/NACK, CQI (Channel Quality Indicator), a precoding matrix indicator (PMI), a rank indicator (RI), etc.

The LTE system supports a sounding reference signal (SRS) a demodulation reference signal (DMRS) as an uplink reference signal. The demodulation reference signal may be combined with a transmission of PUSCH or PUCCH, and may be transmitted by a UE to a base station for demodulation of an uplink signal. The sounding reference signal may be transmitted by a UE to a base station for uplink scheduling. The base station estimate an uplink channel using the received sounding reference signal and uses the estimated uplink channel for uplink scheduling. The sounding reference signal is not combined with a transmission of PUSCH or PUCCH. The same type of base sequence may be used for the demodulation reference signal and the sounding reference signal.

Figure 9:
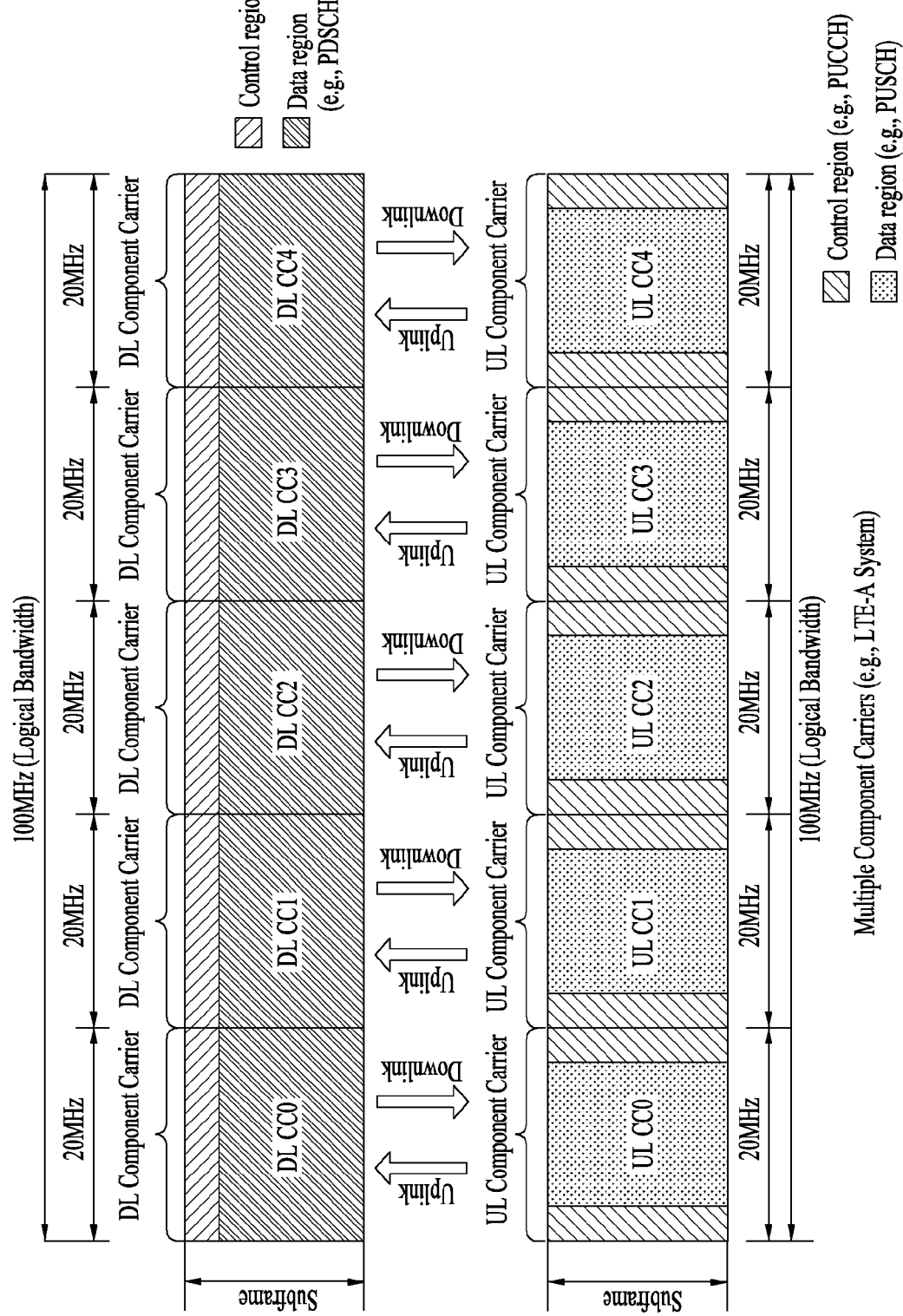
FIGS. 9 and 10 illustrate a carrier aggregation (CA) communication system.

FIG. 9 illustrates a carrier aggregation (CA) communication system.

Referring to FIG. 9, a plurality of uplink/downlink component carriers (CCs) can be aggregated to support a wider uplink/downlink bandwidth. As such, a technique of aggregating and using the plurality of uplink/downlink component carriers is referred to as a carrier aggregation or bandwidth aggregation. A component carrier may be understood as a carrier frequency (or center carrier, center frequency) for a corresponding frequency block. The CCs may be contiguous or non-contiguous in the frequency domain. Bandwidths of the CCs can be independently determined. Asymmetrical CA in which the number of UL CCs is different from the number of DL CCs can be implemented. A link between DL CC and UL CC may be fixed in a system or may be semi-statically configured. Further, even if the entire system bandwidth comprises N CCs, a bandwidth used for monitoring/receiving by a specific UE may be limited to M(<N) CCs. Various parameters for carrier aggregation may be configured in a cell-specific, or UE group-specific, or UE-specific manner.

Control information may be transmitted/received only through a specific CC. This specific CC may be referred to as a primary CC (PCC) and the other CC may be referred to as a secondary CC (SCC). PCC may be used for performing an initial connection establishment procedure or connection re-establishment procedure. PCC may refer to a cell indicated during a handover procedure. SCC may be configurable after an RRC connection establishment and may be used for providing additional radio resources. In an example, scheduling information may be configured to be transmitted and received through a specific CC only, and such a scheduling scheme is referred to as a cross-carrier scheduling (or cross-CC scheduling). When cross-carrier scheduling (or cross-CC scheduling) is applied, a PDCCH for downlink allocation can be transmitted through DL CC#0 and a PDSCH corresponding to the PDCCH can be transmitted through DL CC#2. The term "component carrier" can be replaced by other equivalent terms (e.g. carrier, cell, etc.). For example, PCC and SCC may be interchangeably used with PCell and SCell, respectively. Further, the initial connection establishment procedure may be performed on PCell, and SCell may be additionally aggregated as needed.

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

No CIF

CIF enabled: a PDCCH on a DL CC can be used to allocate a PDSCH or PUSCH resource on a specific DL/UL CC from among a plurality of aggregated DL/UL CCs using the CIF.

LTE DCI format extended to have the CIF

CIF corresponds to a fixed x-bit field (e.g. x=3) (when the CIF is set).

CIF position is fixed irrespective of DCI format size (when the CIF is set).

When the CIF is present, the BS can allocate a PDCCH monitoring DL CC (set) to reduce BD complexity of the UE. For PDSCH/PUSCH scheduling, a UE can detect/decode a PDCCH only in the corresponding DL CC. The BS can transmit the PDCCH only through the monitoring DL CC (set). The monitoring DL CC set can be set UE-specifically, UE-group-specifically or cell-specifically.

Figure 10:
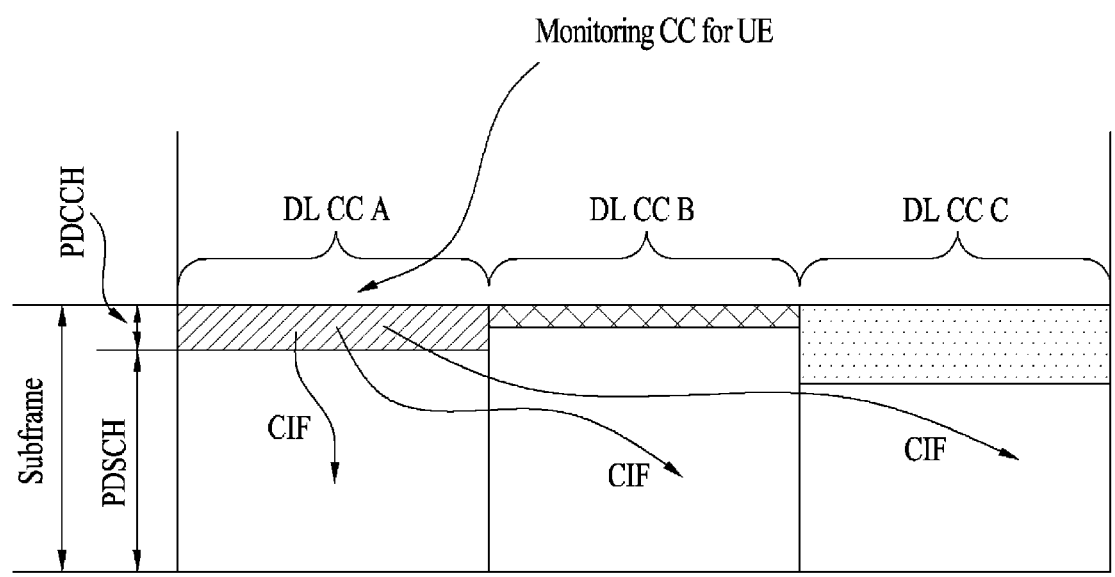

FIG. 10 illustrates a case in which 3 DL CCs are aggregated and DL CC A is set to a monitoring DL CC. When the CIF is disabled, each DL CC can carry a PDCCH that schedules a PDSCH of the DL CC without the CIF according to LTE PDCCH rules. When the CIF is enabled through higher layer signaling, DL CC A can carry not only a PDSCH thereof but also PDSCHs of other DL CCs using the CIF. DL CC B and DL CC C which are not set to monitoring DL CCs do not carry a PDCCH. Here, the term "monitoring DL CC" can be used interchangeably with terms such as "monitoring carrier", "monitoring cell". "scheduling carrier", "scheduling cell", "serving carrier", "serving cell", etc. A DL CC on which a PDSCH corresponding to a PDCCH is transmitted and a UL CC on which a PUSCH corresponding to a PUCCH is transmitted are referred to as a scheduled carrier, a scheduled cell, etc.

In an LTE Release-8/9/10 system, a CRS may be transmitted through all DL subframes except for a DL subframe configured for a specific purpose (e.g., a MBSFN subframe) with respect to an arbitrary carrier. In addition, a control channel such as PCFICH/PDCCH/PHICH may be transmitted across the first some OFDM symbol(s) of all DL subframes. As such, in the LTE Release-8/9/10 system, backward compatibility for providing access and services of an existing UE may be ensured. On the other hand, a next system may introduce a new type of carrier in which all or some of the aforementioned backward compatible legacy signals/channels are not transmitted because an issue in terms of interference between a plurality of cells can be overcome, carrier expansion is enhanced, and a freedom degree for providing advanced feature (e.g., 8Tx MIMO). In the present invention, for convenience, the new type of carrier is defined as a new carrier type (NCT). Compared to this, a carrier type according to legacy 3GPP LTE Release-8/9/10 is referred to as a legacy carrier type (LCT).

In the NCT, basically, transmission of a fixed CRS with high density may be omitted or remarkably reduced. That is, in the NCT, DL data reception and channel state measurement dependent upon CRS transmission may be omitted or remarkably reduced. Instead, DL reception performance may be enhanced and RS overhead may be minimized by receiving DL data based on a DM-RS that is UE-specifically (precoded) and transmitted and measuring a channel state based on a (configurable) CSI-RS with relatively low density so as to effectively use DL resources. Accordingly, only transmission modes (TMs) (e.g., TM 8, 9, or 10), in particular, based on a DM-RS among legacy defined DL TMs may be managed (i.e., set as a DL TM of a UE allocated the NCT) and DL data scheduling through the NCT may be considered.

Synchronization/tracking and various measurements may be required for the NCT. To this end, primary synchronization signal (PSS)/secondary synchronization signal (SSS) with the same or different configuration from the legacy LTE Release-8/9/10 may be set to be transmitted. For example, compared to in LCT, in the NCT, a relative order between synchronization signals (SSs), an SS transmission OFDM symbol position, and so on may be changed, and/or a CRS may be set to be partially transmitted on the time domain (e.g., k (e.g. k=1) subframe periods having specific periods) and the frequency domain (e.g., domain corresponding specific n (e.g. n=6) RB (pairs)). In addition, in the NCT, the CRS may be set to be transmitted through one specific antenna port. A CRS that is transmitted in this form mainly for synchronization/tracking and so on may not be used as an RS for demodulation of a control channel and DL data.

Figure 11:
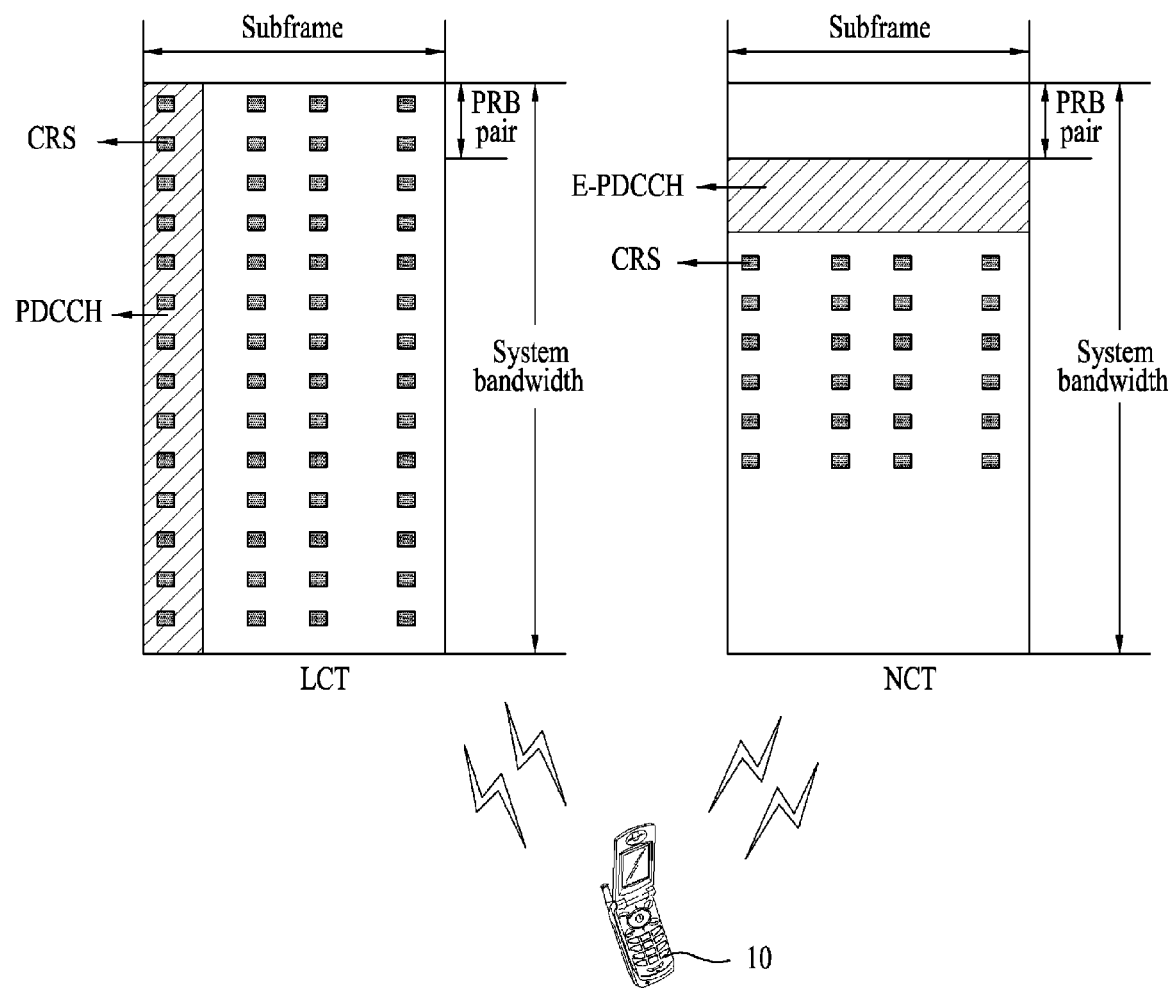
FIG. 11 illustrates exemplary subframe structures of LCT and NCT.

FIG. 11 illustrates exemplary subframe structures of LCT and NCT. Referring to FIG. 11, the LCT may use an L-PDCCH and the NCT may use a UE-specific RS (e.g., DM-RS)-based E-PDCCH. In the NCT, the E-PDCCH may be positioned from an initial OFDM symbol of a subframe unlike in FIG. 12 to be described below. The frequency domain of the LCT and the frequency domain of the NCT may at least partially overlap (Case 1) or may not overlap (Case 2). Case 1 may be a case in which the LCT and the NCT are managed by different eNBs and Case 2 may be a case in which the LCT and the NCT are managed by different eNBs or the same eNB.

An advanced system including 3GPP LTE Release-11 has introduced UE-specific DMRS-based enhanced PDCCH or EPDCCH (E-PDCCH) for enhancing performance and efficiency of a control channel, and so on. The EPDCCH may be configured to be transmitted across physical resource block (PRB) pairs (including a legacy PDSCH region) on the time axis. In more detail, a search space (SS) for EPDCCH detection may include one or more (e.g., 2) EPDCCH sets, each EPDCCH set may occupy a plurality of (e.g., 2, 4, or 8) PRB pairs, and an enhanced CCE or eCCE (ECCE) included in each EPDCCH set may be mapped to be localized or distributed (according to whether one ECCE is spread in a plurality of PRB pairs). In addition, when EPDCCH-based scheduling is set, a subframe for performing EPDCCH transmission/detection may be determined. In addition, the EPDCCH may constitute only a UE-specific search space (USS). Accordingly, the UE may attempt to detect (DCI) only on a PDCCH common search space (CSS) and an EPDCCH USS in a subframe in which EPDCCH transmission/detection is set and attempt to detect DCI only on a PDCCH CSS and a PDCCH USS in a subframe in which EPDCCH transmission/detection is not set. In this specification, the subframe in which EPDCCH transmission/detection is set may be referred to as an EPDCCH subframe and the subframe in which EPDCCH transmission/detection is not set may be referred to as a non-EPDCCH subframe.

Figure 12:
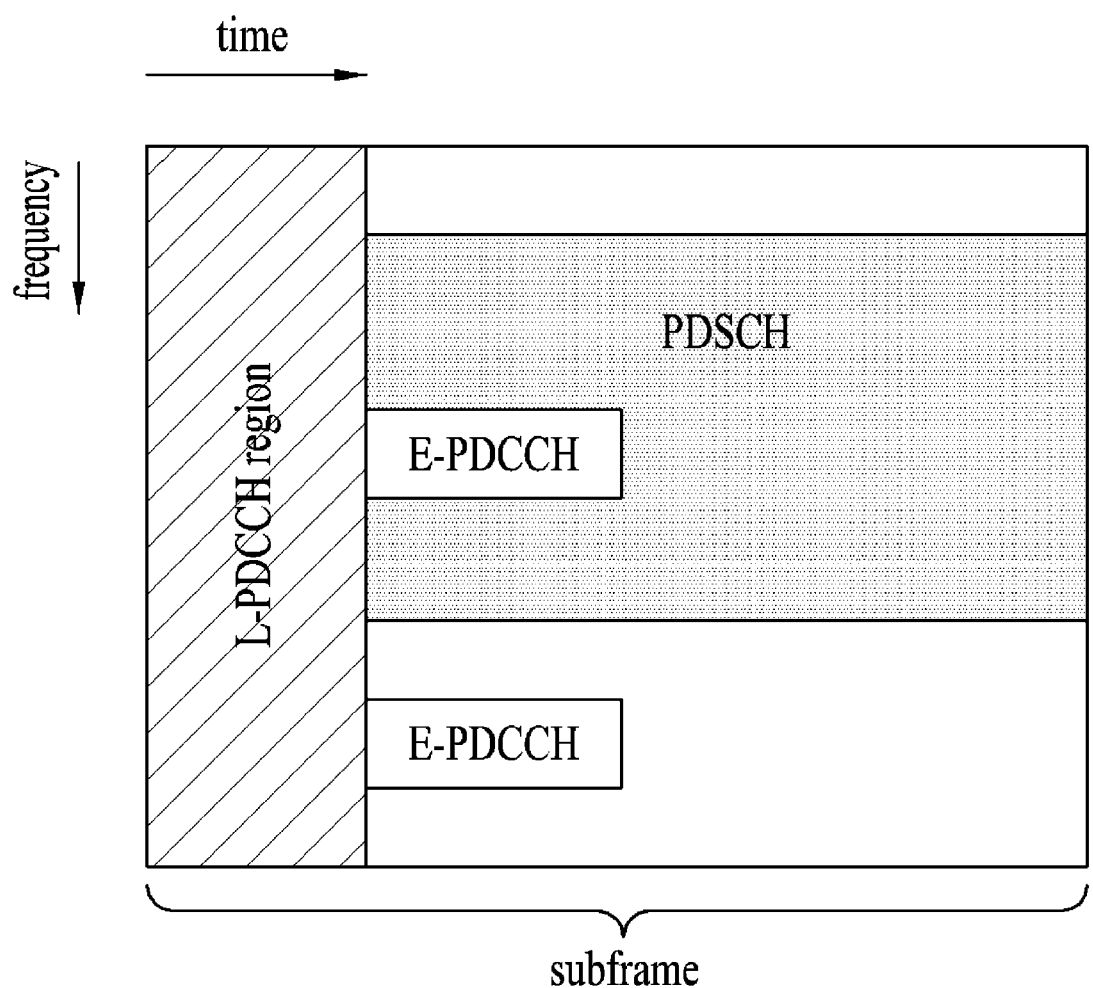
FIG. 12 illustrates an example in which a DL physical channel is allocated to a subframe.

FIG. 12 illustrates an example in which a DL physical channel is allocated to a subframe.

Referring to FIG. 12, a PDCCH (for convenience, legacy PDCCH, LPDCCH, or L-PDCCH) according to legacy LTE Release-8/9/10 may be allocated to a control region of a subframe. In the drawing, a LPDCCH region may refer to a region to which the legacy PDCCH can be allocated. According to the context, the LPDCCH region may refer to a control region or a control channel resource region (i.e., CCE resources) or a PDCCH search space, to which a PDCCH can be actually allocated in the control region. An EPDCCH may be further allocated in a data region (e.g., a resource region for a PDSCH). As illustrated in the drawing, control channel resources may be additionally ensured through an EPDCCH so as to alleviate scheduling restriction due to limited control channel resources of the LPDCCH region.

In the case of an EPDCCH, a USS may be configured with K E-PDCCH set(s) (for each CC/cell) from one UE point of view. For example, K may be greater than or equal to 1 and may be equal to or less than a specific upper limit (e.g., 2). In addition, each EPDCCH set may be configured with specific N PRBs (which belong to a PDSCH region). N and resource/index of a PRB included in the N PRBs may be independently (i.e., set-specifically) allocated. Accordingly, a resource number and index of ECCE included in each EPDCCH set may also be set-specifically set (while being UE-specifically), and in the case of a PUCCH resource/index linked with each corresponding ECCE resource/index, an independent starting PUCCH resource/index may be configured for each EPDCCH set so as to have (UE-specifically) and set-specifically allocated structure. Here, the ECCE resource/index may refer to a basic control channel unit of an EPDCCH including a plurality of REs (while belong to a PRB in a PDSCH region) and may have different configurations according to a transmission type of an EPDCCH. For example, an ECCE for localized transmission may be configured using an RE belonging to the same PRB pair, whereas an ECCE for distributed transmission may be configured by extracting an RE from a plurality of PRB pairs. In the case of a localized ECCE, in order to perform beamforming optimized for each different user using each ECCE, an independent antenna port (AP) for each ECCE resource/index may be associated, and in the case of a distributed ECCE, sets of the same AP may be repeatedly associated in different ECCEs such that a plurality of users commonly uses a series of APs.

A TDD-based legacy LTE Release-8/9/10 system requires a transceiving timing gap containing a transceiving switching gap for transceiving operation switching to a UL subframe (SF) from a DL SF. To this end, a special SF may be managed between the corresponding DL SF and UL SF. For example, various special SF configurations may be supported as shown in Table 2 above according to a situation such as a radio condition and a UE location. In addition, lengths of a DL period (e.g., DwPTS) and a UL period (e.g., UpPTS) that can be configured according to a CP combination (normal or extended) used for DL/UL in a special subframe. Here, a special SF configuration or special SF in which the DL period (e.g., DwPTS) includes only three OFDM symbols may be referred to as a "shortest S" for convenience. For example, as shown in Table 2 above, in the case of a normal CP, special SF configurations #0 and #5 in DL may be the shortest S, and in the case of extended CP, special SF configurations #0 and #4 in DL may be the shortest S.

Figure 13:
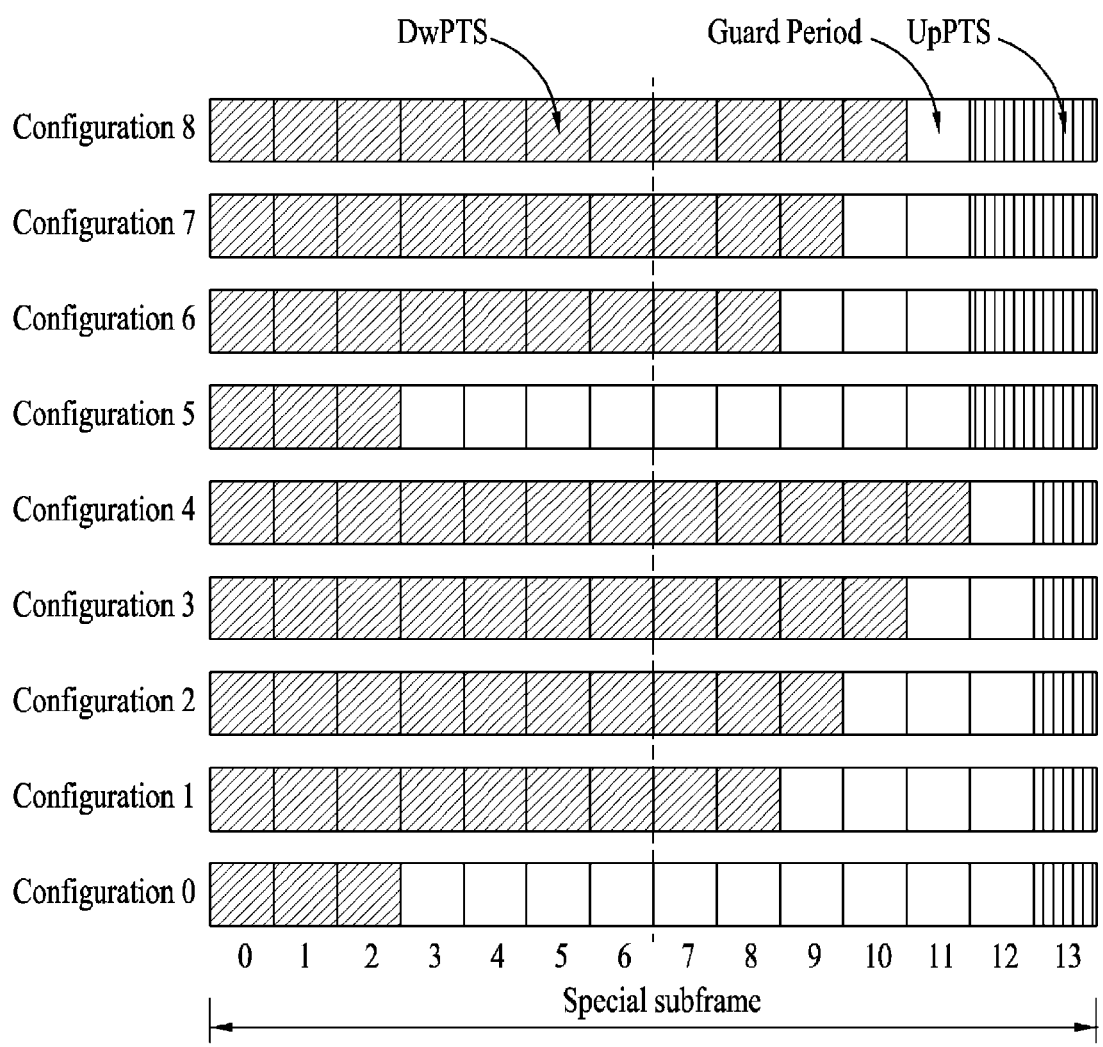
FIG. 13 illustrates an example of the numbers of OFDM symbols in a downlink period, a guard period, and an uplink period according to a special subframe configuration.

FIG. 13 illustrates an example of an OFDM symbol number of a DL period (e.g., DwPTS), a guard period (e.g., GP), and a UL period (e.g., UpPTS) according to the special SF configuration of Table 2 above. For convenience, FIG. 13 illustrates an example in which a normal CP is used (i.e., 14 OFDM symbols per SF). Referring to FIG. 13, the number of OFDM symbols to be used in a DL period (e.g., DwPTS) may be changed according to a special SF configuration. For example, in the case of special SF configurations #0 and #5, initial three OFDM symbols in a first slot may be used as a DL period (e.g., DwPTS). On the other hand, in the case of special SF configurations #1, #2, #3, #4, #6, #7, and #8, all OFDM symbols of a first slot may be used as a DL period (e.g., DwPTS).

As described above, when the shortest S is configured, a demodulation reference signal (DMRS) cannot be transmitted due to a short DL period (e.g., DwPTS). Accordingly, when the shortest S is configured, a DL signal (e.g., a control channel signal and a data channel signal) may be demodulated based on a CRS.

In this case, when the NCT is managed in a TDD manner (for at least DL), a CRS may be set so as not to be transmitted through a DL period (e.g., DwPTS) in the shortest S or even if the CRS may be set so as to be transmitted in the DL period (e.g., DwPTS) in the shortest S, the CRS may be used only for synchronization/tracking and may not be used for demodulation of control channel and DL data. In this case, when a DMRS is not defined in the NCT with respect to a DL period (e.g., DwPTS) in the shortest S like in the legacy LTE Release-8/9/10, three OFDM symbols in the corresponding DL period (e.g., DwPTS) cannot be used both for DL data transmission as well as for (legacy LPDCCH-based) control channel transmission. Accordingly, DL resources may be wasted compared with an existing legacy carrier providing backward compatibility.

Embodiment 1

Accordingly, the following options may be considered with respect to methods for using and configuring a shortest S for TDD-based NCT management. In detail, methods of options 0 to 5 may be considered. At least two of options except for options 0 and 1 may be combined and applied. For example, it may be possible to apply only options 2 and 3 to a DL period (e.g., DwPTS) in the shortest S of the TDD NCT. Here, a PDCCH to be described later may include both a LPDCCH and an EPDCCH.

Option 0: Special SF Configuration Except for Shortest S

With respect to the TDD NCT, a shortest S-based special SF configuration (e.g., #0 and #5 in the case of normal CP in DL and #0 and #4 in the case of extended CP in DL) may not be supported. Option 0 may be useful in that the NCT is mainly a secondary carrier that is additionally aggregated to a legacy carrier and coverage can be deployed at an appropriate level (so as not to be excessively large) in order to enhance resource/power use efficiency.

Option 1: No PDCCH and No DL Data in Shortest S

Both PDCCH transmission and DL data transmission may not be allowed with respect to a DL period (e.g., DwPTS) in the shortest S configured in the TDD NCT. Accordingly, a UE may omit a series of operations associated with blind detection for PDCCH detection and demodulation for DL data reception with respect to the corresponding period. As another method, in the case of the shortest S only, an operation (e.g., UL grant transmission) configured to be performed through the DL period (e.g., DwPTS) in the corresponding shortest S may be performed instead in another specific carrier that is not the corresponding NCT (e.g., through a cross-CC scheduling method). In this case, the specific carrier may be, for example, a primary cell Pcell.

Option 2: E-PDCCH Based UL Grant in Shortest S

With respect to a DL period (e.g., DwPTS) in the shortest S configured in the TDD NCT, only EPDCCH-based UL grant may be allowed. In this case, a separate demodulation RS (having a similar configuration to a DMRS for DL data reception) may be transmitted for corresponding UL grant EPDCCH detection. In this case, the separate demodulation RS may be referred to as an enhanced DMRS (E-DMRS).

Option 3: Cross-CC Scheduled DL Data in Shortest S

With respect to a DL period (e.g., DwPTS) in the shortest S configured in the TDD NCT, only cross-CC scheduled DL data transmission from DL grant PDCCH transmitted through another carrier may be allowed. In this case, for DL data reception, the DMRS may be transmitted. For example, when the NCT is not configured in a cross-CC scheduling mode, cross-CC scheduling from another (predetermined) carrier may be restrictively allowed with respect to only a corresponding shortest S.

Option 4: Cross-SF Scheduled DL Data in Shortest S

Only cross-SF scheduled DL data transmission from a DL grant PDCCH transmitted through a previous DL SF (i.e., a D subframe) of a corresponding S SF may be allowed with respect to a DL period (e.g., DwPTS) in the shortest S configured in the TDD NCT. To this end, the following three methods may be considered.

DL grant/DL data for each D subframe and S subframe: different DL data may be transmitted in D and S subframes, and DL grant PDCCH for each DL data may also be separately transmitted through the corresponding D subframe. In this case, an indicator for identifying an SF (D or S) for transmitting DL data may be signaled in the corresponding DL grant PDCCH. In this case, a DMRS for reception of DL data (which is transmitted through the S subframe) may be transmitted through a DL period (e.g., DwPTS) in the shortest S.

One DL grant over D and S subframes/DL data for each D and S subframe: Different DL data may be transmitted in each of D and S subframes and one DL grant PDCCH may be transmitted through the corresponding subframe D with respect to the two corresponding SFs. In this case, an indicator for identifying a SF (both D and S subframes, only D, or only S) for transmitting DL data may be signaled in the corresponding DL grant PDCCH. In this case, a DMRS for reception of DL data (transmitted through the S subframe) may be transmitted through a DL period (e.g., DwPTS) in the shortest S. When DL data is transmitted in both D and S subframes, a channel estimation result based on the DMRS transmitted through the D subframe may be reused for reception of DL data transmitted in a (immediately next) S subframe as well as reception of DL data transmitted in the D subframe. In this case, only DL data may be received without DMRS transmission in a DL period (e.g., DwPTS) in the shortest S.

One DL grant/DL data over D and S subframes: One DL data may be transmitted over the D and S subframes and one DL grant PDCCH for the DL data may be transmitted through the corresponding D subframe. For example, DL data may be set to be always transmitted over both the D and S subframes or set to be selectively transmitted in both the D and S subframes, only in the D subframe, or only in the S subframe. For example, when DL data is set to be selectively transmitted in the D and/or S subframes, a DMRS may be transmitted through a DL period (e.g., DwPTS) in the shortest S, and an indicator for identifying a region (both D and S subframes, only D, or only S) for transmitting DL data may be signaled in a corresponding DL grant PDCCH. When DL data is transmitted over both the D and S subframes, channel estimation result based on the DMRS transmitted through the D subframe may be reuse for reception of a part of DL data transmitted in a (immediately next) S subframe as well as for reception of a part of DL data transmitted in the D subframe. Accordingly, in this case, only DL data may be received without DMRS transmission in a DL period (e.g., DwPTS) in the shortest S.

Option 5: E-PDCCH Based DL Grant and Corresponding DL Data in Shortest S

With respect to a DL period (e.g., DwPTS) in a shortest S configured in the TDD NCT, only EPDCCH configuration-based DL grant transmission and DL data transmission corresponding thereto may be allowed. In this case, an E-DMRS and DMRS for detection/reception of the corresponding DL grant EPDCCH and DL data corresponding thereto may be transmitted.

In some options of the aforementioned options (Options 0 to 5), when DL data is transmitted in a DL period (e.g., DwPTS) in the shortest S, a method for determining a transport block size needs to be changed. A current 3GPP LTE Rel-8/9/10 system may determine a transport block size using a table represented with a combination of the number of resource blocks (RBs) determined in DL assignment information (or DL grant) and a modulation and coding scheme (MCS). Accordingly, when an eNB determines the number of RBs and a MCS, the number of transmitted bits may be automatically determined. The transport block size is affected by the number of OFDM symbols available for corresponding DL data. In this regard, like in the aforementioned options, when DL data is transmitted using only a very small number of OFDM symbols in the shortest S, a new transport block size table appropriate for this may be required. In detail, when separate DL data (e.g., codeword) is transmitted through only a DL period (e.g., DwPTS) of the shortest S, a transport block size table calculated under the assumption that, for example, three OFDM symbols are used may be used. When one DL data (e.g., codeword) is transmitted over a legacy DL SF and shortest S, a transport block size table calculated under the assumption that OFDM symbols corresponding to the sum of OFDM symbol number used in the DL SF and the shortest S may be used.

As another for determining a transport block size, an existing transport block size table defined for a general DL subframe (SF) of a legacy carrier may be referred to without changes, and a transport block size may be determined by considering a value obtained by multiplying RB number ($N'_{PRB}$) that is actually allocated through DL grant by a specific weighting factor as a RB number $N_{PRB}$ defined in a corresponding transport block size table. Here, the weighting factor may be determined as a ratio of the number of OFDM symbols available in the method (e.g., a region obtained by summing the normal DL SF and the shortest S) compared with the number of OFDM symbols available in a normal DL SF. For example, when separate DL data (e.g., codeword) is transmitted through only a DL period (e.g., DwPTS) of the shortest S, $N_{PRB}=\max\{\text{flooring}(N'_{PRB}\times\alpha),1\}$ may be used ($0<\alpha<1$). When one DL data (e.g., codeword) is transmitted over the DL SF and the shortest S, $N_{PRB}=\max\{\text{flooring}(N'_{PRB}\times\beta),1\}$ may be used ($1<\beta<2$). In this case, for example, $\alpha=0.25$ and $\beta=1.25$.

In the case of a control channel resource unit (e.g., E-CCE) constituting an E-PDCCH (candidate), four or three E-CCEs may be mapped per PRB in consideration of RS overhead, etc. in a normal DL SF (including 14 (normal CP) or 12 (extended CP) OFDM symbols). Accordingly, in the case of an option in which E-PDCCH transmission is allowed among the aforementioned options, one E-CCE may be mapped by considering that only three OFDM symbols in a DL period (e.g., DwPTS) in the shortest S are available.

In the case of a DM-RS (for a normal CP) in legacy Release-10, 8 antenna ports may be divided into 2 code division multiplexing (CDM) groups, and an RS for 4 antenna ports included in each CDM group may be CDM-multiplexed on an RE group including 4 REs using a length-4 spread code (e.g., an orthogonal code). In this case, each CDM group may be mapped to a different RE group, and 4 REs constituting one RE group may belong to different OFDM symbols. However, in the case of a DL period (e.g., DwPTS) in the shortest S, only 3 OFDM symbols are available, and thus a DM-RS configuration of a legacy Release-10 cannot be reused without changes. Accordingly, in the case of an option in which DM-RS and E-DM-RS transmission is allowed among the aforementioned options, 4 or 2 antenna ports may be divided into 2 or 1 CDM groups, respectively, and an RS for 2 antenna ports included in each CDM group may be CDM-multiplexed in an RE group including 2 REs using a length-2 spread code. In this case, each CDM group may be mapped to a different RE group, and 2 REs constituting one RE group may belong to different OFDM symbols. Alternatively, in the case of a NCT shortest S, an RS for 2 or 1 antenna ports may be mapped to a RE group including 2 different REs for each antenna port without CDM. In this case, an RS for each antenna port may be mapped to a different RE group and 2 REs constituting one RE group may belong to different OFDM symbols.

Figure 14:
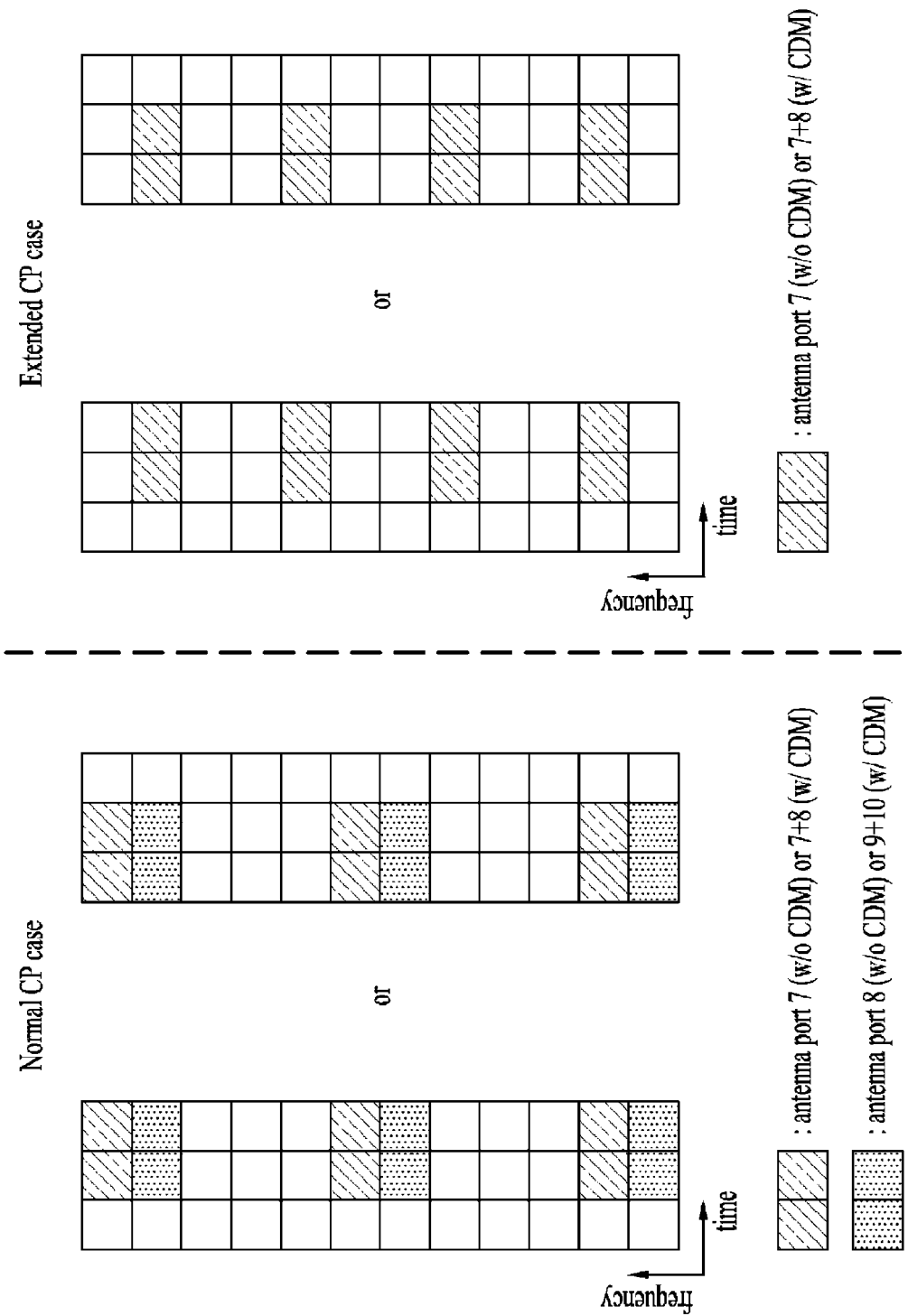
FIG. 14 illustrates an example of a DM-RS configuration according to the present invention.

FIG. 14 illustrates an example of a DM-RS configuration according to the present invention. In this example, assuming that 4, 2, and 1 antenna ports in the above proposal are DM-RS antenna ports {7, 8, 9, 10}, {7, 8}, and {7} in Rel-10, respectively, for convenience of description, the DM-RS configuration shown in FIG. 14 may be considered for a DL period (e.g., DwPTS) in the shortest S of a TDD NCT. In this case, for example, a sequence used for CDM between DM-RS antenna port {7, 8} may be used without changes as a sequence for applying length-2 CDM in the case of extended CP in Rel-10. In this case, for example, [+1, +1] and [−1, +1] may be reused as the length-2 sequence.

In addition, DL data (and/or E-PDCCH) transmission rank may be limited with respect to the shortest S of the TDD NCT so as to map only one antenna port (e.g., DM-RS antenna port 7 of Rel-10) to a RE group including 2 REs (which belong to different OFDM symbols) without CDM/FDM and to transmit the antenna port. For example, a single antenna port-based DM-RS (and/or E-DM-RS) may be transmitted using only a RE corresponding to one antenna port (e.g., 7 or 9) in FIG. 14, a single antenna port-based DM-RS (and/or E-DM-RS) may be transmitted using all REs corresponding to all antenna ports (e.g., 7, 8, 9, and 10) in FIG. 14, or a single antenna port-based DM-RS (and/or E-DM-RS) may be transmitted using an RE group including one RE belong to each CDM group. In this case, DL data is received using only a single DM-RS antenna port, and thus a DCI format used for scheduling of DL data transmitted through the shortest S of the TDD NCT may be limited to only DCI format 1A (as TM-common DCI format). For example, TM-dedicated DCI format (e.g., DCI format 2C) transmission may not be allowed. Accordingly, a UE may perform only a blind decoding operation for DCI format 1A on the shortest S of the TDD NCT (scheduling of DL data transmitted through the corresponding SF).

Embodiment 2

Assuming that only antenna port #0 is used in legacy 3GPP Rel-10, a CRS and a PSS may be transmitted through the first (or initial) OFDM symbol and the third OFDM symbol in a DL period (e.g., DwPTS) in the shortest S, respectively. Here, when a CRS pattern for antenna port #0 of legacy 3GPP Rel-10 is reused, a problem may occur when the proposed options are applied according to whether a CRS and/or a PSS (and/or a SSS) is transmitted in a DL period (e.g., DwPTS) in the NCT shortest S. A solution for this will now be described as follows. Basically, it is assumed that a CRS, a PSS, and an SSS are transmitted through different OFDM symbols.

Case 1: No CRS, No PSS/SSS in Shortest S

All CRS/PSS/SSS may be set not to be transmitted in a DL period (e.g., DwPTS) in a NCT shortest S. In this case, all the proposed options can be applied. In this case, a DM-RS (e.g., E-DM-RS) may be transmitted using a RE of two adjacent OFDM symbols (e.g., the first and second OFDM symbols or the second and third OFDM symbols) (refer to FIG. 14).

Case 2: No CRS, PSS or SSS in Shortest S

Only a PSS or an SSS may be set to be transmitted and only a PSS or a SSS may be set not to be transmitted in a DL period (e.g., DwPTS) in the NCT shortest S. In this case, all the proposed options can be applied. A DM-RS (e.g., E-DM-RS) in the NCT shortest S may be transmitted using an RE of the remaining two OFDM symbols (e.g., the first and second OFDM symbols) except for an OFDM symbol (e.g., the third OFDM symbol) in which PSS/SSS is transmitted.

Case 3: No CRS, PSS and SSS in Shortest S

All PSS/SSS may be set to be transmitted and a CRS may be set not to be transmitted in a DL period (e.g., DwPTS) in the NCT shortest S. In this case, Option 1 or Option 4 (some methods that do not use DM-RS transmission) can be applied in a RB region in which PSS/SSS is transmitted in the NCT shortest S. On the other hand, an option available in Case 1 and a DM-RS (e.g., E-DM-RS) configuration may be applied in other RB regions in the NCT shortest S.

Case 4: CRS, No PSS/SSS in Shortest S

Only a CRS may be set to be transmitted and all PSS/SSS may be set not to be transmitted in a DL period (e.g., DwPTS) in the NCT shortest S. In this case, all the proposed options can be applied. A DM-RS (e.g., E-DM-RS) in the NCT shortest S may be transmitted using an RE of the remaining two OFDM symbols (e.g., the second and third OFDM symbols) except for an OFDM symbol (e.g., the first or initial OFDM symbol) in which a CRS is transmitted.

Case 5: CRS, PSS and/or SSS in Shortest S

A PSS and/or an SSS as well as a CRS may be set to be transmitted in a DL period (e.g., DwPTS) in the NCT shortest S. In this case, Option 1 or Option 4 (some methods that do not use DM-RS transmission) can be applied in an RB region in which PSS/SSS is transmitted in the NCT shortest S. On the other hand, an option available in Case 4 and a DM-RS (e.g., E-DM-RS) configuration may be applied in other RB regions in the NCT shortest S.

An E-CCE mapping method for E-PDCCH transmission may be detailed based on the this, one E-CCE may be set/allocated per one or two PRBs or an E-CCE may not be set/allocated to a specific PRB according to the number of REs that are occupied by an RS (e.g., E-DM-RS) and/or SS (e.g., PSS and/or SSS) in a DL period (e.g., DwPTS) of a (shortest) special SF. For example, an E-CCE may not be allocated in a PRB in a region in which an SS is transmitted and one or two E-CCEs may be allocated per one or two PRBs in a region in which an SS is not transmitted, or one E-CCE may be allocated per two PRBs in a region in which a SS is transmitted and one E-CCE may be allocated per one PRB in a region in which a SS is not transmitted. For example, in the case of a region in which an RS for a plurality of antenna ports (without SS transmission) is transmitted in the form of FDM, one E-CCE per one PRB may be allocated, and in the case of a region in which an RS for a single or a plurality of antenna ports (without SS transmission) is transmitted without FDM (and/or without DCM) (e.g., an RS is transmitted using all REs corresponding to the antenna ports 7, 8, 9, and 10 in FIG. 14), one E-CCE may be allocated per two PRBs. As another example, one E-CCE may be set/allocated per PRB irrespective of RS and SS overhead in a DL period (e.g., DwPTS) of the shortest S and blind decoding for E-PDCCH detection may be performed only on two or more E-CCE aggregation levels, or one E-CCE may be set/allocated per two PRBs irrespective of RS and SS overhead and blind decoding for E-PDCCH may be performed on all E-CCE aggregation levels (including 1). For example, separately from a search space (i.e., an E-PDCCH PRB set) for E-PDCCH detection in a normal DL SF, a search space (i.e., E-PDCCH PRB set) for E-PDCCH detection in a (shortest) special SF and a number of times of blind decoding for each E-CCE aggregation level according to the search space may be independently set/allocated.

The application of the aforementioned methods (Options 1 to 5 according to Cases 1 to 5 and combinations thereof, and the proposed configurations of DM-RS/E-DM-RS) may not be limited only to a TDD NCT in which the shortest S is set. For example, the aforementioned methods can be collectively applied to a case in which all arbitrary special SFs (including a shortest S) are set in a TDD NCT or a special SF in which a DL period (e.g., DwPTS) generally includes N or less OFDM symbols is set in a TDD NCT. Alternatively, a method among the aforementioned methods may be set cell-specifically or UE-specifically. Here, N may be a positive integer and may be, for example, 7 (normal CP case) or 6 (extended CP case) which corresponds to the number of OFDM symbols in one slot in a normal DL SF. Alternatively, N=3 irrespective of CP.

The NCT may also be seriously affective by various control channels/RS signals transmitted through an L-PDCCH region on a legacy carrier. To prevent interference, an E-PDCCH start symbol position (e.g., E-PDCCH_startSym) for the NCT and/or a DL data start symbol position (e.g., DL-data_startSym) may be set. Assuming that an OFDM symbol index is started from #0 in an SF, E-PDCCH_startSym and DL-data_startSym values may be 0 to 3 (or 0 to 4). In this case, in consideration of the E-PDCCH_startSym and DL-data_startSym values, the proposed method may be adaptively applied to an arbitrary special SF set in the NCT or a special SF in which a DL period (e.g., DwPTS) includes N or less OFDM symbols.

In detail, different methods may be applied to a case in which E-PDCCH_startSym and DL-data_startSym have a value equal to or more than K and a case in which E-PDCCH_startSym and DL-data_startSym have a value less than K. K=2 (or K=3) may be satisfied. In detail, when the E-PDCCH_startSym and DL-data_startSym values are equal to or more than K, Option 1 (or some methods that do not use DM-RS transmission in Option 4) may be applied, and when the E-PDCCH_startSym and DL-data_startSym values are less than K, all options may be applied. In addition, from a point of view of a size of an RE group in which DM-RS (e.g., E-DM-RS) is mapped/transmitted, when the E-PDCCH_startSym and DL-data_startSym values are equal to or more than K, Option 1 or a 2-RE configuration-based DM-RS transmission method (similar to FIG. 14) may be applied. That is, the DM-RS may be mapped to a RE group including 2 REs belonging to different OFDM symbols. On the other hand, when the E-PDCCH_startSym and DL-data_startSym values are less than K, a 4-RE configuration-based DM-RS transmission method similar to legacy 3GPP Rel-10 may be applied. That is, the DM-RS may be mapped to an RE group including 4 REs belonging to different OFDM symbols.

For example, when the E-PDCCH_startSym and/or DL-data_startSym values are given by a value equal to or more than 2 with respect to a TDD NCT in which a shortest S including only 3 OFDM symbols in a DL period (e.g., DwPTS) is set as described above, the number of actually available OFDM symbols may be limited to 1 or less. Accordingly, an option (e.g., Options 2, 3, and 5 and some methods that use DM-RS transmission in Option 4) in which E-PDCCH and/or DL transmission through only the shortest S is allowed among the aforementioned options may be excluded and Option 1 (or some methods that do not use DM-RS transmission in Option 4) may be applied. In the same condition as the aforementioned condition, on the other hand, when the E-PDCCH_startSym and/or DL-data_startSym values are given by a value less than 2, two or more actually available OFDM symbols are ensured, and thus all the aforementioned options can be applied.

As another example, assuming a TDD NCT in which a special SF including 6 OFDM symbols in a DL period (e.g., DwPTS) is set, when E-PDCCH_startSym and/or DL-data_startSym values are given by a value equal to or more than 3, the number of actually available OFDM symbols is limited to 3 or less, and thus an Option 1 or 2-RE configuration-based DM-RS/E-DM-RS transmission method (similar to FIG. 14) may be applied. In the same condition as the aforementioned condition, on the other hand, when the E-PDCCH_startSym and/or DL-data_startSym values are given by a value less than 3, 4 or more actually available OFDM symbols can be ensured, and thus a legacy 4-RE configuration-based DM-RS/E-DM-RS transmission method may be applied.

In the method for applying different methods according to the E-PDCCH_startSym and DL-data_startSym values, the "number of actually available OFDM symbols" may be calculated in consideration of only an OFDM symbol (e.g., an OFDM symbol in which PSS/SSS/CRS, etc. are not transmitted) available for DM-RS/E-DM-RS. K as a reference for applying different methods may be differently determined in the proposed method according to the calculated "number of actually available OFDM symbols".

As another example, in the case of TDD NCT, E-PDCCH_startSym and/or DL-data_startSym values to be applied to a shortest S (or all arbitrary special SFs or a special SF including specific N or less OFDM symbols in a DL period (e.g., DwPTS)) may be independently set (separately from in a normal DL SF) or fixed E-PDCCH_startSym and/or DL-data_startSym values that are always predetermined/predefined (e.g., the first OFDM symbol index #"0") may be applied to a corresponding (shortest) special SF.

All methods and principles according to the present invention may be applied in the same/similar way irrespective of division of FDD/TDD and/or a carrier type (e.g., NCT or LCT). For example, even if a method according to the present invention applies a different form/configuration from a general signal/channel configuration/transmission method in the legacy LCT, configurability for application of the method according to the present invention may be provided to an advanced UE (e.g., a UE supporting NCT) on the legacy LCT as a target. For convenience of description, legacy DCI for scheduling one fixed SF may be defined as single-SF DCI and DCI for performing simultaneous scheduling of a plurality of SFs or selective scheduling of one or more SFs may be defined as multi-SF DCI or cross-SF DCI.

It may be possible to extend and generalize the aforementioned method to apply different E-PDCCH_startSym and/or DL-data_startSym values according to a situation/ condition. In detail, the E-PDCCH_startSym and/or DL-data_startSym values to be applied to each SF or each SF set may be independently set/defined. For example, assuming 2 SF set #1 and #2, the E-PDCCH_startSym and/or DL-data_startSym values may be different applied such that the E-PDCCH_startSym and/or DL-data_startSym values in SF set #1 are OFDM symbol index #0 and the E-PDCCH_startSym and/or DL-data_startSym values in SF set #2 are OFDM symbol index #3. This method may be effective to enhance throughput in consideration of UE/control load and/or almost blank subframe (ABS) configuration-based) time-domain inter-cell interference coordination (ICIC), etc., and/or E-PDCCH_startSym and/or DL-data_startSym values to be applied to each RB or each RB group (or each EPDCCH set) may be independently set/defined. This setting may be performed via higher layer signaling (e.g., RRC signaling) or DL grant (that schedules corresponding DL data in the case of DL data). For example, independent E-PDCCH_startSym and/or DL-data_startSym values may be set/defined and applied with respect to single-SF DCI and DL data corresponding thereto, and multi-SF/cross-SF DCI and DL data corresponding thereto.

In addition, when E-PDCCH_startSym and/or DL-data_startSym are referred to as E-PDCCH/DL-data_startSym for convenience, whether rate-matching is applied to a specific control channel during transmission/reception of E-PDCCH/DL-data according to each EPDCCH set, each E-PDCCH/DL-data_startSym value, or a E-PDCCH/DL-data_startSym value (e.g., when E-PDCCH/DL-data_startSym is set/defined to the same value as a specific value (e.g., OFDM symbol index #0) or a value less/equal to or more than the specific value) may be (independently) set/defined. In the present invention, rate-matching may include a puncturing operation, and/or whether rate-matching is applied to a specific control channel during transmission/reception of E-PDCCH/DL-data in each UE or each SF (set) may be (independently) set/defined. In this case, for example, the control channel to which rate-matching can be applied may be set/determined using PCFICH and/or (an entire portion or partial determined portion of) PHICH and/or (an entire portion or partial determined portion of) CSS, and it may be possible to set/define whether rate-matching is applied to each of them. In addition, for example, this configuration may be performed via higher layer signaling (e.g., RRC signaling) or DL grant (for scheduling corresponding DL data in the case of DL data). For example, whether rate-matching may be independently applied to single-SF DCI and DL data corresponding thereto, and multi-SF/cross-SF DCI and DL data corresponding thereto may be (independently) set/defined and applied.

In addition, an EPDCCH set configured in each SF (set) and related information may also be independently set for each SF (set) in consideration of application of E-PDCCH/DL-data_startSym for each SF (set) and/or application of control channel rate-matching for each SF (set). For example, the related information may include E-PDCCH/DL-data_startSym set/corresponding to the number of EPDCCH set (e.g., 1 or 2), a size of each set (e.g., 2, 4, or 8 PRBs), and each set, an EPDCCH transmission type (e.g., localized or distributed ECCE) and DMRS scrambling sequence/parameter set for each set, EREG/ECCE configuration information and ECCE aggregation level/blind decoding information allocated for each set, implicit PUCCH (e.g., PUCCH format 1a/1b) resource start offset and explicit PUCCH (e.g., PUCCH format 1a/1b/3) resource set configuration set/corresponding to each set, and so on. In addition, for example, independent EPDCCH set and related information may be set and applied with respect to single-SF DCI and multi-SF/cross-SF DCI (or SF (determined) as detection target of multi-SF/cross-SF DCI and the remaining SFs except therefor).

In the case of LCT, an EPDCCH candidate that (entirely or partially) overlap and is allocated with a PRB in which PSS/SSS and/or PBCH is transmitted may not be transmitted/received and/or a UE may not attempt to perform detecting/receiving operation on the corresponding EPDCCH candidate. Accordingly, in consideration of this, in the case of LCT (for example, having a small system bandwidth (BW)), an SF in which PSS/SSS and/or PBCH is transmitted may not be configured as an EPDCCH monitoring SF (e.g., the corresponding SF is set to monitor L-PDCCH) so as to stably ensure/maintain control channel transmission change and scheduling freedom degree. On the other hand, in the case of NCT, when the aforementioned operation is also maintained while (CRS-based) L-PDCCH transmission is not allowed, it may be impossible to use a PRB in which PSS/SSS and/or PBCH is transmitted to transmit a control channel, and accordingly (in particular, in the case of an NCT that has a small system BW and/or operating in a TDD manner) control channel transmission change and scheduling freedom degree may be reduced to reduce throughput.

Accordingly, in the NCT, an EPDCCH candidate (which (entirely or partially) overlaps and allocated with a PRB in which PSS/SSS and/or PBCH is transmitted) in a SF in which PSS/SSS and/or PBCH is transmitted may be transmitted/received while rate-matching is applied to the corresponding PSS/SSS and/or PBCH (unlike in the legacy LCT) (and/or the UE may attempt to perform detection/reception operations on the corresponding EPDCCH candidate) and/or whether the corresponding EPDCCH candidate is used, that is, whether the corresponding EPDCCH candidate is available or not (like in the legacy LCT) for control channel transmission (based on rate-matching with respect to PSS/SSS and/or PBCH) may be set/defined. Whether the corresponding EPDCCH candidate is used may be independently set/defined with respect to each UE or each SF (set) (or for each EPDCCH set).

Embodiment 3

Figure 15:
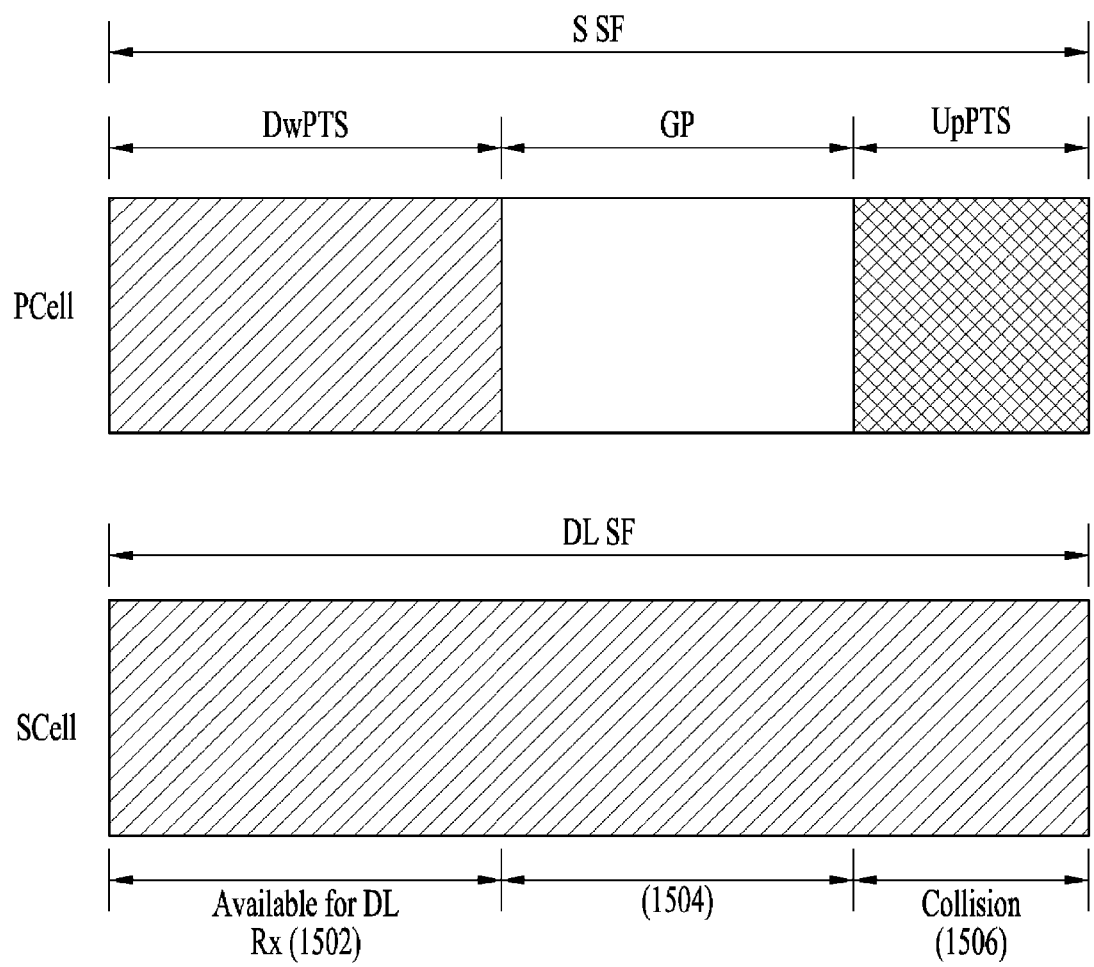
FIG. 15 illustrates collision of subframes in different cells.

FIG. 15 illustrates collision of subframes in different cells. Referring to FIG. 15, a Pcell and a Scell may be determined as a special SF and a DL SF, respectively with respect to a UE that does not support simultaneous transceiving operation/capability (or operates in a half-duplex manner) (which is referred to as "half-duplex (HD) Pcell S+Scell D (Pcell S+Scell D with HD)"). In this case, link directions between two cells are different in a partial time period 1506 of the corresponding subframe, and thus a UE may transmit and receive a signal to only one of the two cells. Likewise, when link directions are different in a subframe of two aggregated cells in a UE that does not support simultaneous transceiving operation/capability (or operates in a half-duplex manner), it is said that cells or subframes collide. On the other hand, link directions of two cells correspond to each other in a partial time period 1502 of the corresponding subframe, and thus both the two cells may receive a signal. Although two cells do not collide in a partial time period 1504 of the corresponding subframe, the period 1504 is set as a guard period in the Pcell, and thus the UE may not transmit and receive any signal.

In the case of half-duplex (HD) Pcell S+Scell D, the proposed methods for the (shortest) special SF according to the present invention may be applied in the same/similar way to a DL SF of the corresponding Scell. In addition, the methods for the (shortest) special SF according to the present invention may also be applied in the same/similar way to a specific SF (e.g., an SF set to perform detection/reception of PMCH) set as a MBSFN (irrespective of a frame structure type (e.g., FDD or TDD)).

In the case of NCT, in the example of "half-duplex Pcell S+Scell D", a DL signal/channel may be received while only a symbol period (i.e., the same symbol/configuration as the corresponding DwPTS) corresponding to a specific DL period (e.g., DwPTS) is exceptionally assumed to be receivable DL resources with respect to a DL SF of (NCT-based) Scell. In this case, the specific DL period may be 1) a DL period (e.g., DwPTS) of a special SF set in a Pcell, 2) a DL period (e.g., DwPTS) of a special SF set in a Scell, 3) a DL period (e.g., DwPTS) with a shorter length from a Pcell and a Scell, or 4) a DL period (e.g., DwPTS) with a smaller number of symbols from a Pcell and a Scell, in the corresponding SF. In this case, the UE may receive, for example, a UL grant EPDCCH and a DMRS for detection/reception thereof, and/or a PDSCH, a DL grant EPDCCH for scheduling the same, and a DMRS for detection/reception thereof in a specific DL period. In this case, an EPDCCH search space configuration (e.g., EREG/ECCE mapping and configuration, an ECCE aggregation level, and a number of times of blind decoding) and/or DMRS transmission RE mapping, etc. in the corresponding DL SF may be defined/configured to use EPDCCH/DMRS configuration/mapping applied to the specific DL period (which is not a normal DL SF) (i.e., corresponding DwPTS) (which is referred to as Alt-1). Alternatively, a portion that uses EPDCCH/DMRS configuration/mapping applied to a normal DL SF without changes and is mapped/configured to resource (e.g., RE) outside the specific DL period (i.e., corresponding DwPTS) may not be used, rate-matched, or punctured (which is referred to as Alt-2). Alternatively, it may be possible to apply different methods (Alt-1 or Alt-2) to EREG/ECCE mapping and configuration, ECCE aggregation level, a number of times of blind detection, and DMRS transmission RE mapping. Likewise, a method for applying Alt-1 or Alt-2 to a specific DL period is referred to as "Method 1" for convenience.

In the case of NCT, any DL signal/channel reception may not be supported in order to reduce complexity for embodying a UE in the example of "half-duplex Pcell S+Scell D". This method is referred to as "Method 4" for convenience.

In the case of LCT, a UE may operate while assuming/considering that only PDCCH and/or PHICH transmission/reception is allowed, detection/reception of PDSCH/EPDCCH/PMCH/PRS is omitted/abandoned, or there is no indication/scheduling with respect to PDSCH/EPDCCH/PMCH/PRS in a DL SF of a corresponding Scell in the example of "half-duplex Pcell S+Scell D". This method is referred to as "Method 2".

In a CA situation in which SF timing between cells is not aligned (i.e., based on staggered SF timing) or a CA situation of a UL-DL configuration to be further introduced in the future, there is the potential that a special SF in a specific cell and a UL SF of another specific cell collide with each other at the same SF timing. In this situation, when a Pcell is a special SF and a Scell is a UL SF, a UE that does not support simultaneous transceiving operation/capability (or operates in a half-duplex manner) may operate while assuming/considering that only SRS transmission is allowed in the corresponding Scell, for example, transmission of the remaining UL signal/channel (e.g., PRACH/PUCCH/PUSCH) is omitted/abandoned or there is no indication/scheduling with respect to transmission of the remaining UL signal/channel. On the other hand, when a Pcell is a UL SF and a Scell is a special SF, only UL transmission (e.g., SRS and/or PRACH) through a UL period (e.g., UpPTS period) is allowed in the corresponding Scell, for example, DL signal/channel transmission through a DL period (e.g., DwPTS) is omitted/abandoned or there is no indication/scheduling with respect to transmission of the DL signal/channel transmission. As such, the method applied when a UL SF and a special SF collide between a Pcell and a Scell is referred to as "Method 3".

When a UL SF and a special SF collide between a Pcell and a Scell, transmission of any UL signal/channel may not be supported in order to reduce complexity for embody a UE. This method is referred to as "Method 5" for convenience.

The collision handling method between a special SF and a DL/UL SF may be extensively applied to a CA situation between a TDD cell and a FDD cell. In detail, when the TDD cell and the FDD cell are carrier-aggregated, the collision handling method may also be extensively applied to the case in which a special SF of the TDD cell and a DL/UL SF pair (or on DL/UL carriers constituting the pair) of the FDD cell are set at the same SF timing. For example, when a special SF of the TDD Pcell and a DL/UL SF pair of the FDD Scell collide at the same SF timing, Method 1 or 2 may be applied to a DL SF of the FDD Scell (according to a cell/carrier type) and Method 3 may be applied to a UL SF of the FDD Scell. As another example, when a special SF of the TDD Pcell and a DL/UL SF pair of the FDD Scell collide at the same SF timing, Method 1 or 2 may be applied to a DL SF of the FDD Scell (according to a cell/carrier type), whereas Method 3 may be applied to a UL SF of the FDD Scell while Method 5 is applied to a UL SF of the FDD Scell (i.e., any UL signal/channel transmission is not supported) or Method 4 is applied to a DL SF of the FDD Scell (i.e., any DL signal/channel transmission is not supported). Alternatively, Methods 4 and 5 may be applied to a DL SF and a UL SF of the FDD Scell, respectively in order to reduce complexity for embodying a UE. In addition, the same/similar operation/method as the aforementioned operation/method may also be applied to an opposite combination of Pcell/Scell, i.e., to the case in which the FDD Pcell and the TDD Scell are carrier-aggregated.

Application of the operation/method (e.g., Methods 1 to 5) may not be limited only to a UE that does not support simultaneous transceiving operation/capability (or operates in a half-duplex (HD) manner). For example, the same/similar operation/method as the above operation/method (Methods 1 to 5) may be applied to even a UE that supports simultaneous transceiving operation/capability (or operates in a full-duplex (HD) manner) due to interference between DL/UL resources according to an internal between carriers (e.g., TDD carrier, FDD DL carrier, and FDD UL carrier) included in TDD and FDD cells. In this case, the same/similar operation/method as the above operation/method (Methods 1 to 5) may be applied irrespective of whether a UE has simultaneous transceiving operation/capability and/or a frame configuration type of the Pcell and the Scell (e.g., FDD or TDD). For example, when an interval between a TDD carrier and a FDD DL carrier is smaller than a specific value, if a TDD special SF and a FDD DL SF collide at the same SF timing, Method 1, 2, or 4 may be applied to the corresponding FDD DL SF or Method 5 may be applied to a corresponding TDD special SF. As another example, when an interval between a TDD carrier and a FDD UL carrier is smaller than a specific value, if a TDD special SF and a FDD UL SF collide at the same SF timing, Method 3 or 5 may be applied to the corresponding FDD UL SF or Method 4 may be applied to the corresponding TDD special SF. The above method may be automatically set according to an interval between TDD/FDD carriers (i.e., when a corresponding interval satisfies a specific condition) or may be set via higher layer signaling (according to an internal between TDD/FDD carriers or irrespective of the corresponding interval).

Embodiment 4

As another approach, in the case of a TDD NCT, Alt-3), an entire or partial UL period (e.g., UpPTS) in a shortest S may be omitted and a DL period (e.g., DwPTS) may be extended by as much as the omitted UL period (e.g., UpPTS), or on the other hand, Alt-4) an entire or partial DL period (e.g., DwPTS) in a shortest S may be omitted and a UL period (e.g., UpPTS) may be extended by as much as the omitted DL period (e.g., DwPTS). In the case of Alt-3, the aforementioned Options 1 to 5 and the proposed DM-RS/E-DM-RS configuration may be applied with modification or without changes to the extended DL period (e.g., DwPTS) according to the basic principles proposed in the aforementioned Cases 1 to 5, and in the case of Alt-4, transmission of additional UL signal and data (e.g., SRS/PRACH and/or PUSCH with a short length, etc.) may be set/allowed with respect to the extended UpPTS period. More generally, in the case of a TDD NCT, the aforementioned approach method (Alt-3 or Alt-4) may be similarly introduced to all arbitrary special SFs (including the shortest S) or a special SF in which a DL period (e.g., DwPTS) includes specific N or less OFDM symbols. That is, in the case of the TDD NCT, an entire or partial UL period (e.g., UpPTS) in a special SF may be omitted and a DL period (e.g., DwPTS) may be extended by as much as the omitted UL period (e.g., UpPTS), or on the other hand, an entire or partial DL period (e.g., DwPTS) in a special SF may be omitted and a UL period (e.g., UpPTS) may be extended by as much as the omitted DL period (e.g., DwPTS).

Unlike a legacy special SF configuration including [DL period (e.g., DwPTS)+guard period (e.g., Guard Period, GP)+UL period (e.g., UpPTS)], a new type of special SF including only [DL period (e.g., DwPTS)+guard period (e.g., GP)] or [guard period (e.g., GP)+UL period (e.g., UpPTS)] based on the aforementioned method or other methods may be considered for more flexible and effective use of DL/UL resources and data transmission. For convenience of description, a special SF with [DL period (e.g., DwPTS)+guard period (e.g., GP)] configuration is referred to as "D-only-S" and a special SF with a [guard period (e.g., GP)+UL period (e.g., UpPTS)] configuration is referred to as "U-only-S". For convenience of description, a legacy special SF with a [DL period (e.g., DwPTS)+guard period (e.g., Guard Period, GP)+UL period (e.g., UpPTS)] configuration is referred to as "normal S".

FIG. 16 illustrates an example of a special SF configuration. FIG. 16(B) illustrates D-only-S and FIG. 16(C) illustrates U-only-S. The length of a DL period (e.g., DwPTS) in the D-only-S may be the same as or different from the length of a DL period (e.g., DwPTS) of a normal S. For example, the length of a DL period (e.g., DwPTS) of the D-only-S may be increased by a UL period (e.g., UpPTS) of a normal S based on the length of a DL period (e.g., DwPTS) of the normal S. In addition, the length of a UL period (e.g., UpPTS) in the U-only-S may be the same as or different from the length of a UL period (e.g., UpPTS) of the normal S. For example, the length of a UL period (e.g., UpPTS) of the U-only-S may be increased by a DL period (e.g., DwPTS) of the normal S based on the length of a UL period (e.g., UpPTS) of the normal S.

When a carrier aggregation (CA) situation including the special SF-based cell is considered with respect to a UE that does not support simultaneous transceiving operation/capability (or operates in a half-duplex manner), it is required to determine/define a UE operation and signal processing method when different SFs between cells collide at the same timing.

(Pcell, Scell)=(D-Only-S, DL SF)

In this case, Method 1 (when a corresponding Scell is a NCT) or Method 2 (when the corresponding Scell is a LCT) may be applied to a DL SF of a Scell. When Method 2 is applied, for example, only PDCCH and/or PHICH transmission/reception may be allowed and detection/reception of PDSCH/EPDCCH/PMCH/PRS may be omitted/abandoned (or a UE may operate while assuming/considering that there is no indication/scheduling with respect to reception of corresponding DL signal/channel).

(Pcell, Scell)=(DL SF, D-Only-S)

In this case, a DL signal/channel receiving operation (which is the same as in a non-CA situation) may be performed on an entire DL period (e.g., DwPTS) of a Scell without separate restriction/limitation.

(Pcell, Scell)=(D-Only-S, UL SF)

In this case, Method 5 may be applied to a UL SF of a Scell. For example, UL signal/channel transmission in a UL SF of a Scell may be omitted/abandoned (or a UE may operate while assuming/considering that there is no indication/scheduling with respect to UL signal/channel transmission).

(Pcell, Scell)=(UL SF, D-Only-S)

In this case, DL signal/channel reception may be omitted/abandoned with respect to a DL period (e.g., DwPTS) of a Scell (or a UE may operate while assuming/considering that there is no indication/scheduling with respect to DL signal/channel reception).

(Pcell, Scell)=(D-Only-S, Normal S)

In this case, UL signal/channel transmission may be omitted/abandoned with respect to a UL period (e.g., UpPTS) of a Scell (or a UE may operate while assuming/considering that there is no indication/scheduling with respect to UL signal/channel transmission).

(Pcell, Scell)=(Normal S, D-Only-S)

In this case, Method 1 (when a corresponding Scell is a NCT) or Method 2 (when the corresponding Scell is a LCT) may be applied to a DL period (e.g., DwPTS) of a Scell. When Method 2 is applied, only PDCCH and/or PHICH transmission/reception may be allowed and detection/reception of PDSCH/EPDCCH/PMCH/PRS may be omitted/abandoned (or a UE may operate while assuming/considering that there is no indication/scheduling with respect to reception of corresponding DL signal/channel).

(Pcell, Scell)=(U-Only-S, DL SF)

In this case, Method 4 may be applied to a DL SF of a Scell. For example, DL signal/channel reception may be omitted/abandoned with respect to a DL SF of a Scell (or a UE may operate while assuming/considering that there is no indication/scheduling with respect to DL signal/channel reception).

(Pcell, Scell)=(DL SF, U-Only-S)

In this case, UL signal/channel transmission in a UL period (e.g., UpPTS) of a Scell may be omitted/abandoned (or a UE may operate while assuming/considering that there is no indication/scheduling with respect to UL signal/channel transmission).

(Pcell, Scell)=(U-Only-S, UL SF)

In this case, only transmission of SRS (and/or PRACH) may be allowed in a UL SF of a Scell and transmission of PUSCH/PUCCH (and/or PRACH) may be omitted/abandoned (or a UE may operate while assuming/considering that there is no indication/scheduling with respect to transmission of corresponding UL signal/channel).

(Pcell, Scell)=(UL SF, U-Only-S)

In this case, a UL signal/channel transmission operation (which is the same as in a non-CA situation) may be performed on an entire UL period (e.g., UpPTS) of a Scell without separate restriction/limitation.

(Pcell, Scell)=(U-Only-S, Normal S)

In this case, DL signal/channel reception may be omitted/abandoned with respect to a DL period (e.g., DwPTS) of a Scell (or a UE may operate while assuming/considering that there is no indication/scheduling with respect to DL signal/channel reception).

(Pcell, Scell)=(Normal S, U-Only-S)

In this case, only SRS (and/or PRACH) transmission may be allowed in a UL period of a Scell and transmission of PUSCH/PUCCH (and/or PRACH) may be omitted/abandoned (or a UE may operate while assuming/considering that there is no indication/scheduling with respect to transmission of corresponding UL signal/channel).

(Pcell, Scell)=(D-Only-S, U-Only-S)

In this case, UL signal/channel transmission in a UL period (e.g., UpPTS) of a Scell may be omitted/abandoned (or a UE may operate while assuming/considering that there is no indication/scheduling with respect to UL signal/channel transmission).

(Pcell, Scell)=(U-Only-S, D-Only-S)

In this case, DL signal/channel reception may be omitted/abandoned (or a UE may operate while assuming/considering that there is no indication/scheduling with respect to DL signal/channel reception) with respect to a DL period (e.g., DwPTS) of a Scell.

As described above, transmission of a PUSCH (with a short length) and scheduling therefor may also be allowed/supported through a UL period (e.g., UpPTS) in the case of a specific special SF (hereinafter, referred to as U-only-S) including U-only-S. UL grant reception timing for scheduling PUSCH transmission and/or PHICH receiving timing corresponding to the corresponding PUSCH transmission in the U-only-S may be determined as a DL SF (e.g., SF #0 or #5) present 6 SFs before from the corresponding U-only-S (e.g., SF #1 or #6) or a DL SF or special SF (e.g., SF #1 or #6) present before 5 SFs. For example, when the U-only-S is SF #1, the UL grant/PHICH receiving timing may be determined as SF #5 of an immediately previous radio frame (in the case of 6 SFs before) or determined as SF #6 of an immediately previous radio frame (in the case of 5 SFs before). For example, when the U-only-S is SF #6, UL grant/PHICH receiving timing may be determined as SF #0 of the same radio frame (in the case of 6 SFs before) or determined as SF #1 of the same radio frame (in the case of 5 SFs before).

In this case, the determined UL grant/PHICH receiving timing for the U-only-S may be determined to be the same as (predefined) UL grant/PHICH receiving timing for a specific UL SF, and simultaneous/selective scheduling may be performed on the U-only-S and/or a specific UL SF through a cross-SF scheduling method. In this case, in the case of PHICH, 1) with respect to a UL SF, like an existing method, PHICH resource/index (referred to as PHICH-U) may be determined based on a lowest PRB index and a DMRS cyclic shift, and a PHICH corresponding to the U-only-S may be determined based on PHICH resource/index obtained by adding specific offset to PHICH-U. Alternatively, 2) with respect to a UL SF, like an existing method, non-adaptive retransmission based on PHICH (PHICH-U) reference is allowed, whereas non-adaptive retransmission may not be allowed with respect to the U-only-S (based on ACK signaling in an unconditional higher layer) and only adaptive retransmission based on UL grant may be allowed without PHICH reference. Alternatively, 3) a PHICH corresponding to a UL SF and the U-only-S may be determined as one legacy PHICH-U resource/index (i.e., ACK/NACK signaled through corresponding PHICH-U may be interpreted/considered as logical AND operation result between repletion responses in response to PUSCH transmission in the UL SF and the U-only-S).

In consideration of a CA situation in which SF timing between cells is not aligned (i.e., based on staggered SF timing) or a CA situation of a UL-DL configuration to be further introduced in the future, independent (different) special SF configurations for respective special SF timing (e.g., SF #1 or SF #6) may be configured. When independent special SF configurations are configured, for example, the length and symbol number of a DL period (e.g., DwPTS)/UL period (e.g., UpPTS), the length of DL/UL CP, and so on may be independently (differently) configured. For example, in the case of SF #1, special SF configuration 0 may be configured, and in the case of SF #6, special SF configuration 1 may be configured.

In addition, it may be possible to configure independent (different) UL-DL configurations with respect to [SF #0 to SF #4] corresponding to a front portion of a radio frame and [SF #5 to SF #9] corresponding to a rear portion of the radio frame. When the independent UL-DL configurations are configured, for example, an arrangement order of DL SF/UL SF/special SF may be independently (differently) may be configured. For example, UL-DL configuration 1 may be configured with respect to [SF #0 to SF #4] and UL-DL configuration 2 may be configured with respect to [SF #5 to SF #9]. In this case, DL (DL grant/DL data→HARQ-ACK) HARQ timing may be based on a specific UL-DL configuration in which entire D or S SF timing of the front and rear portions is determined as D or S, and UL (UL grant→UL data→PHICH) HARQ timing may be based on a specific UL-DL configuration in which entire U SF timing of the front and rear portions is determined as U.

Embodiment 5

As another approach, in order to overcome issues in terms of data/control transmission/signaling with a small size/short length and timing latency, etc. of HARQ (e.g., grant→data→feedback), a new SF type (referred to as "R" for convenience) configured in an period order of [UL period (e.g., UpPTS)+DL period (e.g., DwPTS)] and a new UL-DL configuration including the same may be considered. For example, R may be arranged immediately after U or S and cannot be arranged immediately after D or R. In addition, D or R may be arranged immediately after R, and U or R cannot be arranged immediately after R.

For example, U positioned between U and D or S and D in the legacy UL-DL configuration may be replaced with R to configure the following new UL-DL configuration. In the following description, an SF type in the UL-DL configuration is exemplified with order/configuration of [SF #0 to SF #4]+[SF #5 to SF #9]. However, the present invention is not limited thereto, and SF number/index may be changed (e.g., shifted) while maintaining the SF type order. Here, HARQ-ACK transmitting timing for DL data reception in R may be determined as R present 5 SFs or 10 SFs before, and UL grant/PHICH receiving timing configured in the existing replaced U may be applied without changes to UL data transmission in R.

In this case, similarly to the aforementioned description, different UL-DL configurations may be combined/mixed with respect to front and rear portions of a radio frame, DL HARQ timing may be based on a specific UL-DL configuration in which all D, S, or R SF timing are determined as D or S, and UL HARQ timing may be based on a specific UL-DL configuration in which all U or R SF timing are determined as U.

0) UL-DL configuration 0-1: [D/S/U/U/R]+[D/S/U/U/R]
1) UL-DL configuration 1-1: [D/S/U/R/D]+[D/S/U/R/D]
2) UL-DL configuration 2-1: [D/S/R/D/D]+[D/S/R/D/D]
3) UL-DL configuration 3-1: [D/S/U/U/R]+[D/D/D/D/D]
4) UL-DL configuration 4-1: [D/S/U/R/D]+[D/D/D/D/D]
5) UL-DL configuration 5-1: [D/S/R/D/D]+[D/D/D/D/D]
6) UL-DL configuration 6-1: [D/S/U/U/R]+[D/S/U/R/D]

As another example, the following UL-DL configuration including only S and R may be considered. In this case, for example, in order to manage a HARQ process for DL/UL data scheduling and/or corresponding UL-DL configuration with respect to S and/or R, an HARQ timing relationship (e.g., 4 [ms or SFs or TTIs] are taken for each of DL grant/DL data→HARQ-ACK, UL grant→UL data→PHICH) and/or the number (e.g., 8) of HARQ processes, which are defined/set in a FDD system, may be applied.

7) UL-DL configuration 7: [R/S/R/S/R]+[S/R/S/R/S]

Table 6 below shows the UL-DL configuration 0-1 to 6-1 and UL-DL configuration 7. As described above, the present invention is not limited to Table 6 below, and for example, subframe numbers/indexes may be independently shifted to generate a new combination while maintaining the type/order of subframes with respect to each UL-DL configuration.

TABLE 6

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0-1 | D | S | U | U | R | D | S | U | U | R |
| 1-1 | D | S | U | R | D | D | S | U | R | D |
| 2-1 | D | S | R | D | D | D | S | R | D | D |
| 3-1 | D | S | U | U | R | D | D | D | D | D |
| 4-1 | D | S | U | R | D | D | D | D | D | D |
| 5-1 | D | S | R | D | D | D | D | D | D | D |
| 6-1 | D | S | U | U | R | D | S | U | R | D |
| 7 | R | S | R | S | R | S | R | S | R | S |

The method according to the present invention is not limited to a special SF of a TDD NCT, and the principle of the present invention may be applied in a similar way to a case in which one SF is configured with a similar form (e.g., DwPTS+Tx/Rx switching gap+UpPTS) to a special SF without division of FDD/TDD and/or irrespective of a carrier type. For example, in a CA situation between different TDD UL-DL configurations, a Pcell and a (NCT-based) Scell may be SFs that are differently configured as a special SF and a DL SF. In this example, when a simultaneous transceiving operation is not supported/allowed (or based on a half-duplex manner), only a (front) portion of a DL SF period of a SCell may be enabled due to a switching period required by the Pcell. Accordingly, in this example, a DL SF of the corresponding Scell may be considered as a shortest S configuration (a DwPTS period of the corresponding S) and the method according to the present invention may be extensively thereto in the same/similar way.

Alternatively, when the remaining normal DL period except for a period set for a special purpose (e.g., MBSFN) in one SF is set to be relatively small (like DwPTS in the special SF), a similar principle to the proposal according to the present invention may be applied. A representative example of the case corresponds to a SF set as a MBSFN, and the method according to the present invention (e.g., an operation of Option 1 or 2, and an operation according to E-PDCCH related E-DM-RS transmission/E-CCE mapping and E-PDCCH_startSym, etc.) may be extensively modified and applied to m (e.g., m=2) front OFDM symbol periods of a corresponding SF except for a period of the corresponding SF, in which a MBSFN signal, i.e., MBSFN data and MBSFN-RS are transmitted (or configured to be transmitted). In addition, the MBSFN data may be considered as the same as "DL data in shortest S" and the method (e.g., an operation according to Option 3, 4, or 5) related to the present invention may be applied/used. In this case, for example, the MBSFN data may be cross-CC scheduled from a carrier that is not a carrier in which a MBFSN SF for transmitting the corresponding data is set or may be cross-SF scheduled from an (immediately) previous SF that is not the corresponding MBFSN SF.

An advanced LTE system may reconfigure a specific UL subframe (or special subframe), which is previously configured in one TDD cell/carrier, for example, through a system information block (SIB), as a DL subframe or reconfigure the specific UL subframe (or special subframe) as a UL subframe. This scheme may be referred to as enhanced interference management and traffic adaptation (eIMTA). For example, upon receiving information indicating reconfiguration of a specific subframe as a DL subframe from a UL subframe (or special subframe), an advanced UE may manage the specific subframe as a DL subframe (or vice versa). The information indicating reconfiguration may be semi-statically or dynamically received through L1 signaling (e.g., signaling through a PDCCH), L2 signaling (e.g., signaling through a MAC message), higher layer signaling (e.g., RRC signaling), or the like. In addition, for example, reconfiguration of a subframe in a TDD system may be performed by configuring conversion to a DL subframe from a UL subframe so as to satisfy a plurality of predetermined UL-DL configuration (e.g., Table 1) or reconfiguring the UL-DL configuration. In addition, the specific UL subframe may be reconfigured as a DL subframe or a special subframe in a FDD call/carrier through the eIMTA scheme.

When the subframe reconfiguration (or the eIMTA scheme) is applied, the method according to the present invention may be applied. For example, upon receiving the aforementioned information indicating reconfiguration of the subframe, an advanced UE may reconfigure and use a specific UL subframe as a DL subframe or a special subframe. In this case, the reconfigured special subframe may have a special subframe configuration (e.g., D-only-S, U-only-S, and R subframe) according to the present invention. In addition, the advanced UE may operate while assuming/considering that a collision subframe is configured between a specific UL subframe prior to reconfiguration and a DL subframe or special subframe after reconfiguration. For example, Embodiments 1 to 5 or a combination thereof may be applied to the specific UL subframe prior to reconfiguration and the DL subframe or special subframe after reconfiguration.

In addition, a specific UE may function as an eNB (or relay) through system-to-system communication or device-to-device communication in a system or a device in which a plurality of cells is connected to a small cell (e.g., a femto cell and a pico cell) via a backhaul and is aggregated, and thus embodiments (e.g., Embodiments 1 to 5 or a combination thereof) or principles according to the present invention may also be applied in the same/similar way to a system in which a plurality of cells is aggregated.

Figure 17:
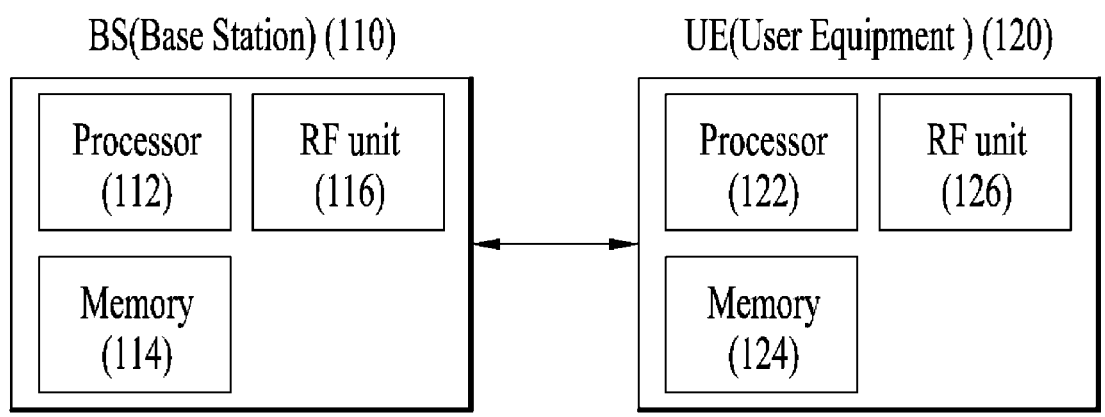
FIG. 17 illustrates a base station and a user equipment to which the present invention is applicable.

FIG. 17 illustrates a base station and a user equipment to which the present invention is applicable.

Referring to FIG. 17, a wireless communication system includes the BS 110 and the UE 120. When the wireless communication system includes a relay, the BS 110 or the UE 120 may be replaced with the relay.

The BS 110 includes a processor 112, a memory 114, and a radio frequency (RF) unit 116. The processor 112 may be configured to embody the procedures and/or methods proposed by the present invention. The memory 114 is connected to the processor 112 and stores various pieces of information associated with an operation of the processor 112. The RF unit 116 is connected to the processor 112 and transmits/receives a radio signal. The UE 120 includes a process 122, a memory 124, and an RF unit 126. The processor 122 may be configured to embody the procedures and/or methods proposed by the present invention. The memory 124 is connected to the processor 122 and stores various pieces of information associated with an operation of the processor 122. The RF unit 126 is connected to the processor 122 and transmits/receives a radio signal.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a user equipment (UE), a base station (BS), etc.

The invention claimed is:

1. A method for communicating with a base station by a user equipment (UE) operating in half-duplex in a wireless communication system supporting a plurality of carrier types, the method comprising:
   transmitting or receiving a signal to or from the base station through a first subframe located between a downlink subframe and an uplink subframe in a first cell configured in time division duplex (TDD),
   wherein when the first cell operates as a first carrier type, the first subframe comprises a first downlink period, a first guard period, and a first uplink period,
   wherein when the first cell operates as a second carrier type, the first subframe comprises only a second downlink period and a second guard period or comprises only a second uplink period or the second guard period,
   wherein a length of the second uplink period is increased by a length of the first downlink period as compared to a length of the first uplink period, and a length of the second downlink period is increased by a length of the first uplink period as compared to a length of the first downlink period, and
   wherein the first carrier type indicates a carrier type in which a cell-common reference signal is transmitted over an entire system band in all subframes, and the second carrier type indicates a carrier type in which the cell-common reference signal is transmitted over at least part of the system band in some subframes.

2. The method according to claim 1, wherein, when a second cell is additionally aggregated with the first cell in the UE, and when a link direction of the first cell and a link direction of the second cell are different in an at least partial period of a time period corresponding to the first subframe, transmission or reception of a signal through the second cell is omitted in the at least partial period.

3. The method according to claim 1, wherein, when a second cell is additionally aggregated with the first cell in the UE, when the first cell operates as the first carrier type in the first subframe, and when the second cell is configured as downlink in an at least partial period of a time period corresponding to the first subframe, a downlink signal is received through the second cell only in a specific period of the time period.

4. The method according to claim 3, wherein the specific period corresponds to the first downlink period, a downlink period configured in the second cell, a downlink period having a shorter length from among the first cell and the second cell, or a downlink period having a smaller number of symbols from among the first cell and the second cell.

5. The method according to claim 1, wherein, when a second cell is additionally aggregated with the first cell in the UE, when the first cell operates as the first carrier type in the first subframe, and when the second cell is configured as uplink in a time period corresponding to the first subframe, transmission of a physical uplink shared channel signal or a physical uplink control channel signal through the second cell is omitted in the time period.

6. The method according to claim 1, wherein, when a second cell is additionally aggregated with the first cell in the UE, when the first cell operates as the second carrier type and the second cell operates as the first carrier type in a time period corresponding to the first subframe, when the first subframe comprises only the second downlink period and the second guard period, and when the second cell is configured as downlink in the time period, detection or reception of a physical downlink shared channel, a physical downlink control channel mapped over a data region of a subframe, a physical multicast channel, and a positioning reference signal is omitted in the time period.

7. The method according to claim 1, wherein, when a second cell is additionally aggregated with the first cell in the UE, when the first cell operates as the second carrier type and the second cell operates as the first carrier type in a time period corresponding to the first subframe, when the first subframe comprises only the second downlink period and the second guard period, and when the second cell is configured as uplink in the time period, transmission of a physical uplink shared channel and a physical uplink control channel is omitted in the time period.

8. A user equipment (UE) operating in a wireless communication system supporting a plurality of carrier types, the UE comprising:
a radio frequency (RF) unit; and
a processor, that controls the RF unit to:
transmit or receive a signal to or from the base station through a first subframe located between a downlink subframe and an uplink subframe in a first cell configured in time division duplex (TDD) through the RF unit,
wherein when the first cell operates as a first carrier type, the first subframe comprises a first downlink period, a first guard period, and a first uplink period,
wherein when the first cell operates as a second carrier type, the first subframe comprises only a second downlink period and a second guard period or comprises only a second uplink period or the second guard period,
wherein a length of the second uplink period is increased by a length of the first downlink period as compared to a length of the first uplink period, and a length of the second downlink period is increased by a length of the first uplink period as compared to a length of the first downlink period, and
wherein the first carrier type indicates a carrier type in which a cell-common reference signal is transmitted over an entire system band in all subframes, and the second carrier type indicates a carrier type in which the cell-common reference signal is transmitted over at least part of the system band in some subframes.

9. The UE according to claim 8, wherein, when a second cell is additionally aggregated with the first cell in the UE, and when a link direction of the first cell and a link direction of the second cell are different in an at least partial period of a time period corresponding to the first subframe, the processor further omits transmission or reception of a signal through the second cell in the at least partial period.

10. The UE according to claim 8, wherein, when a second cell is additionally aggregated with the first cell in the UE, when the first cell operates as the first carrier type in the first subframe, and when the second cell is configured as downlink in an at least partial period of a time period corresponding to the first subframe, the processor further controls the RF unit to receive a downlink signal through the second cell only in a specific period of the time period.

11. The UE according to claim 8, wherein the specific period corresponds to the first downlink period, a downlink period configured in the second cell, a downlink period having a shorter length from among the first cell and the second cell, or a downlink period having a smaller number of symbols from among the first cell and the second cell.

12. The UE according to claim 8, wherein, when a second cell is additionally aggregated with the first cell in the UE, when the first cell operates as the first carrier type in the first subframe, and when the second cell is configured in uplink in a time period corresponding to the first subframe, the processor further omits transmission of a physical uplink shared channel signal or a physical uplink control channel signal through the second cell in the time period.

13. The UE according to claim 8, wherein, when a second cell is additionally aggregated with the first cell in the UE, when the first cell operates as the second carrier type and the second cell operates as the first carrier type in a time period corresponding to the first subframe, when the first subframe comprises only the second downlink period and the second guard period, and when the second cell is configured as downlink in the time period, the processor further omits detection or reception of a physical downlink shared channel, a physical downlink control channel mapped over a data region of a subframe, a physical multicast channel, and a positioning reference signal in the time period.

14. The UE according to claim 8, wherein, when a second cell is additionally aggregated with the first cell in the UE, when the first cell operates as the second carrier type and the second cell operates as the first carrier type in a time period corresponding to the first subframe, when the first subframe comprises only the second downlink period and the second guard period, and when the second cell is configured in uplink in the time period, the processor further omits transmission of a physical uplink shared channel and a physical uplink control channel in the time period.

* * * * *